United States Patent
Nagaeda et al.

(10) Patent No.: US 6,826,318 B2
(45) Date of Patent: Nov. 30, 2004

(54) VARIABLE POLARIZATION PLANE ROTATOR AND OPTICAL DEVICE USING SAME

(75) Inventors: Hiroshi Nagaeda, Sapporo (JP); Nobuaki Mitamura, Sapporo (JP); Kazuaki Akimoto, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 143 days.

(21) Appl. No.: 10/061,307

(22) Filed: Feb. 4, 2002

(65) Prior Publication Data

US 2003/0072512 A1 Apr. 17, 2003

(30) Foreign Application Priority Data

Oct. 12, 2001 (JP) ........................................ 2001-314950

(51) Int. Cl.⁷ ................................................. G02B 6/00
(52) U.S. Cl. ........................... 385/11; 385/27; 398/152; 398/184; 359/483; 359/494
(58) Field of Search .............................. 385/11, 15, 27; 398/152, 184; 359/483, 494, 504

(56) References Cited

U.S. PATENT DOCUMENTS

| | | | |
|---|---|---|---|
| 5,276,747 A | 1/1994 | Pan et al. ...................... 385/34 |
| 5,557,692 A | 9/1996 | Pan et al. ...................... 385/11 |
| 5,727,109 A | 3/1998 | Pan et al. .................... 385/140 |
| 6,339,492 B1 * | 1/2002 | Terahara et al. ............. 359/283 |
| 6,493,129 B2 * | 12/2002 | Terahara et al. ............. 359/283 |
| 2001/0010593 A1 * | 8/2001 | Terahara et al. ............. 359/484 |
| 2001/0055262 A1 * | 12/2001 | Kasazumi et al. ...... 369/112.02 |
| 2003/0002131 A1 * | 1/2003 | Zou et al. .................... 359/291 |
| 2003/0016432 A1 * | 1/2003 | Terahara et al. ............. 359/256 |

FOREIGN PATENT DOCUMENTS

| | | | |
|---|---|---|---|
| EP | 932068 A2 * | 7/1999 | ........... G02F/01/09 |
| JP | 57-100723 | 6/1982 | |
| JP | 57-125925 | 8/1982 | |
| JP | 61-285427 | 12/1986 | |
| JP | 6-51255 | 2/1994 | |
| JP | 7-261140 | 10/1995 | |
| JP | 8-505960 | 6/1996 | |
| JP | 8-505961 | 6/1996 | |
| JP | 11-052339 | 2/1999 | |
| JP | 11-271700 | 10/1999 | |
| JP | 2001-13477 | 1/2001 | |

* cited by examiner

*Primary Examiner*—Rodney Bovernick
*Assistant Examiner*—Sung Pak
(74) *Attorney, Agent, or Firm*—Staas & Halsey LLP

(57) ABSTRACT

An optical device includes a small and low-cost variable polarization plane rotator that can control a rotation angle of the polarization plane easily. A variable polarization plane rotator is provided with a λ/4 phase plate having an optical axis in the same direction as, or at a 90 degree angle relative to, a polarization direction of an input light beam. A phase difference variable element has an optical axis at a ±45 degree angle relative to the optical axis of the λ/4 phase plate, to apply a variable phase difference between the polarization components parallel to and perpendicular to the optical axis thereof. A phase difference adjustment section adjusts the variable phase difference of the phase difference variable element, wherein the input light beam after being transmitted through the phase difference variable element to form elliptically polarized light or circularly polarized light, is transmitted through the λ/4 phase plate to form linearly polarized light. The polarization plane of the input light beam is rotated by an angle corresponding to the phase difference applied by the phase difference variable element.

13 Claims, 15 Drawing Sheets

POLARIZATION STATE AT EACH POINT

P1　　　　　P2　　　　　P3

POLARIZATION STATE AT EACH POINT

COMBINE INTO OUTPUT SIDE OPTICAL FIBER

GOING PATH

RETURNING PATH

VARIABLE POLARIZATION PLANE ROTATOR AND OPTICAL DEVICE USING SAME

BACKGROUND OF THE INVENTION (1) Field of the Invention

The present invention relates to a variable polarization plane rotator that rotates the polarization plane of an input light beam. In particular, the invention relates to a variable polarization plane rotator suitable for rotating the polarization plane of linearly polarized light by an arbitrary angle, and an optical device using the same.

(2) Description of Related Art

As a conventional variable polarization plane rotator, there has been known, for example, a variable Faraday rotator that applies a magneto-optical effect in which the polarization plane of an input light beam is rotated by changing a magnetic field to be applied to a magneto-optical crystal. FIG. 22 shows a structural example of a conventional variable Faraday rotator. In FIG. 22, a conventional variable Faraday rotator 100 is arranged on an optical axis between an input side optical fiber 101 having a collimator lens 102 and an output side optical fiber 103 having a collimator lens 104, and rotates the polarization plane of an input light beam output from the collimator lens 102 on the input side by a required angle, to send to the collimator lens 104 on the output side. It is assumed, here, that this variable Faraday rotator 100 is constructed by combining a Faraday element (magneto-optical crystal) 110, with permanent magnets 111 and electromagnets 112 that apply magnetic fields to Faraday element 110 from two directions different from each other by 90 degrees. In such a specific structure, the magnetization direction of the Faraday element 110 points the direction of a composite magnetic field comprising a constant magnetic field from the permanent magnets 111 and a variable magnetic field from the electromagnets 112, and the composite magnetic field is arranged to be strong enough for the magnetization to be saturated. As a result, the magnetization vector of the Faraday element 110 is constant in its magnitude and only its direction is changed. Therefore, the magnetization components parallel to the travel direction of light beam, is changed corresponding to the direction of the composite magnetic field, that is, corresponding to the intensity of the variable magnetic field from the electromagnets 112, and the Faraday rotation angle to be determined by those magnetization components parallel to the travel direction of light beam, is changed corresponding to the intensity of the magnetic field from the electromagnets 112.

Furthermore, for a conventional variable polarization plane rotator, for example, a construction wherein liquid crystal is used has been also known. This conventional variable polarization plane rotator using liquid crystal rotates the polarization plane of an input light beam by changing an electric field applied to the liquid crystal cell.

The conventional variable polarization plane rotators utilizing Faraday elements, liquid crystal and the like as mentioned above are used in various optical devices, for example such as variable optical attenuators, optical switches, optical isolators, optical filters and the like. To be specific, a variable optical attenuator using a variable Faraday rotator is disclosed in Japanese Unexamined Patent Publication No. 6-51255, and an optical filter (gain equalizer) using a variable Faraday rotator is described in Japanese Unexamined Patent Publication No. 11-271700. Furthermore, a variable optical attenuator or an optical switch using liquid crystal is disclosed in Japanese Unexamined Patent Publication Nos. 2001-13477, 11-52339, 7-261140 and 61-285427, Japanese Unexamined Utility Model Publication No. 57-100723, Japanese National Publication Nos. 8-505960 and 8-505961. Moreover, the aforementioned Japanese National Publication No. 8-505961 discloses an optical isolator using liquid crystal.

In various optical devices as mentioned above, adjustment of the attenuation of transmission light, switching of optical paths, control of transmission (loss) wavelength characteristics and the like have been realized based on the rotation control of the polarization plane by a variable polarization plane rotator.

However, for conventional variable polarization plane rotators as mentioned above, in a case of variable Faraday rotators utilizing magneto-optical effects, since the magnetic field should be made variable, electromagnets must be used so that the physical size of the rotator becomes large, and also a comparatively expensive Faraday element is used, so there is a problem of high cost.

Furthermore, in a case of variable polarization plane rotators using liquid crystal, it is easy to change the rotation angle of the polarization plane of an input light beam into either one of two alternative states (for example, a non-rotated state and a state rotated to a specific angle). However, there is a problem in that it is difficult to control the rotation angle of the polarization plane in intermediate states between the two states. In the aforementioned Japanese Unexamined Patent Publication No. 2001-13477, a technique that makes it easy to control intermediate states by arranging two 45° twisted nematic liquid crystals in series is proposed. However, in this case, it is necessary to switch the control of the two twisted nematic liquid crystals according to the rotation angle of the polarization plane. Therefore, there is a disadvantage that the control becomes complicated.

SUMMARY OF THE INVENTION

The present invention addresses the abovementioned points with the object of providing a small and low-cost variable polarization plane rotator that can control a rotation angle of polarization plane easily, and an optical device using the same.

To achieve the abovementioned object, a variable polarization plane rotator according to the present invention is provided with a phase plate, a phase difference variable element, and a phase difference adjustment section, as a construction for rotating a polarization plane of linearly polarized light. The phase plate has an optical axis in the same direction as, or at a 90 degree angle relative to, a polarization direction of input light beam, and applies, to the light beam being transmitted, a 90 degree phase difference between a polarization component parallel to the optical axis and a polarization component perpendicular to the optical axis. The phase difference variable element has an optical axis at a ±45 degree angle relative to the optical axis of the phase plate, and applies, to the light beam being transmitted, a variable phase difference between the polarization component parallel to the optical axis and the polarization component perpendicular to the optical axis. The phase difference adjustment section adjusts the variable phase difference of the phase difference variable element. The construction of this variable polarization plane rotator is such that the input light beam, after being transmitted through the phase difference variable element to be into an elliptically polarized light or a circularly polarized light, is transmitted through the phase plate, to be into a linearly polarized light, so that the polarization plane of the input light beam is rotated by an angle corresponding to the phase difference applied by the phase difference variable element.

According to the variable polarization plane rotator as described above, the rotation of the polarization plane can be controlled by the combination of the phase difference variable element and the phase plate. Therefore, it becomes possible to achieve miniaturization and low cost compared to a conventional Faraday rotator or the like. At the same time, it becomes possible to control the rotation angle easily since the rotation angle of the polarization plane can be arbitrarily set by adjusting the phase difference applied by the phase difference variable element.

As one aspect of the abovementioned variable polarization plane rotator, the construction may be transmission type, wherein the input light beam output from an input side optical path is transmitted through the phase difference variable element and the phase plate in succession, to be input to an output side optical path. Furthermore, as another aspect, the construction may be reflection type, wherein a reflecting plate for reflecting light is provided, the input light beam output from an input side optical path is transmitted through the phase plate and the phase difference variable element in succession, to be reflected by the reflecting plate, and again transmitted through the phase difference variable element and the phase plate in succession, to be input to an output side optical path.

Furthermore, as a further aspect, in which the abovementioned embodiments are modified, a second phase difference variable element and a second phase difference adjustment section may be disposed instead of the phase plate. The second phase difference variable element has an optical axis in the same direction as, or at a 90 degree angle relative to, the polarization direction of the input light beam, and applies, to the light beam being transmitted, a variable phase difference between the polarization component parallel to the optical axis and the polarization component perpendicular to the optical axis. The second phase difference adjustment section adjusts such that the variable phase difference of the second phase difference variable element becomes 90 degrees depending on the wavelength of the input light beam.

In the variable polarization plane rotator as described above, even in a case where the wavelength range of the input light beam has a width of certain degree, it becomes possible to apply reliably a 90 degree phase difference corresponding to the wavelength by the second phase difference variable element and the second phase difference adjustment section.

The variable polarization plane rotator according to the present invention as mentioned above can be used as an optical component for rotating the polarization plane of linearly polarized light by arbitrary angles, in various optical devices such as variable optical attenuators, optical switches, optical filters and the like.

Other objects, features and advantages of this invention will become apparent from the following description of embodiments given in conjunction with the accompanying drawings.

BRIEF DESCRIPTION OF THE DRAWINGS

FIG. 15 is a diagram for explaining the performance of the variable optical attenuator of FIG. 14, in which

DETAILED DESCRIPTION OF THE INVENTION

As follows is a description of embodiments of the present invention based on drawings.

Figure 1:
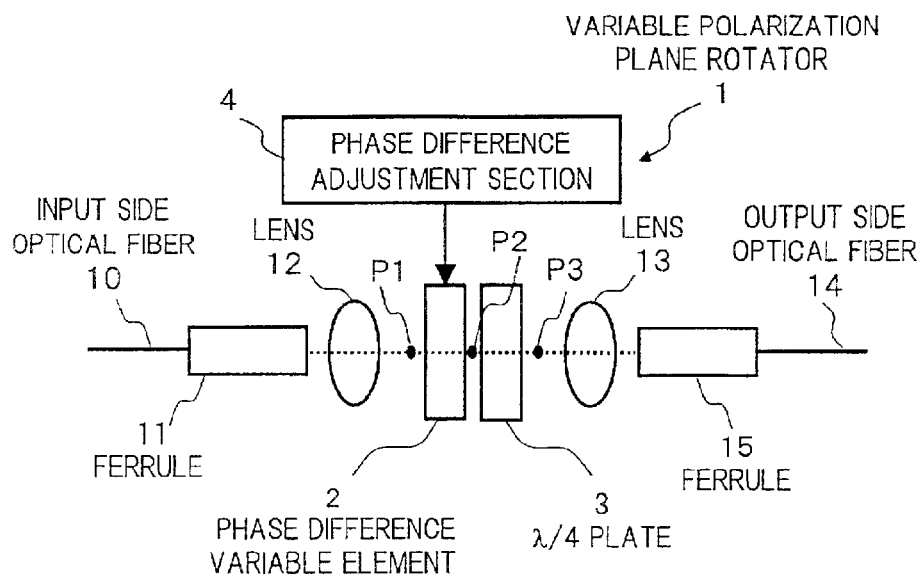
FIG. 1 is a block diagram showing a first embodiment of a variable polarization plane rotator according to the present invention.

FIG. 1 is a block diagram showing a first embodiment of a variable polarization plane rotator according to the present invention.

In FIG. 1, this variable polarization plane rotator 1 comprises, for example, a phase difference variable element 2, a ¼ wavelength plate (referred to, hereunder as λ/4 plate) 3 serving as a phase plate, and a phase difference adjustment section 4. This variable polarization plane rotator 1 is arranged on an optical axis between an input side optical fiber 10 (input side optical path) having a collimator lens 12 and an output side optical fiber 14 (output side optical path) having a collimator lens 13, and an input light beam of linearly polarized light output from the lens 12 on the input side, is input to the phase difference variable element 2 and the λ/4 plate 3 in succession, a polarization plane of the input light beam is rotated, and the linearly polarized light transmitted through the λ/4 plate 3 is sent to the lens 13 on the output side.

Here, numerals 11 and 15 denote ferrules disposed at end portions of the input side optical fiber 10 and output side optical fiber 14, respectively. Furthermore, P1 denotes a point between the lens 12 and the phase difference variable element 2, P2 denotes a point between the phase difference variable element 2 and the λ/4 plate 3, and P3 denotes a point between the λ/4 plate 3 and the lens 13.

Figure 2:
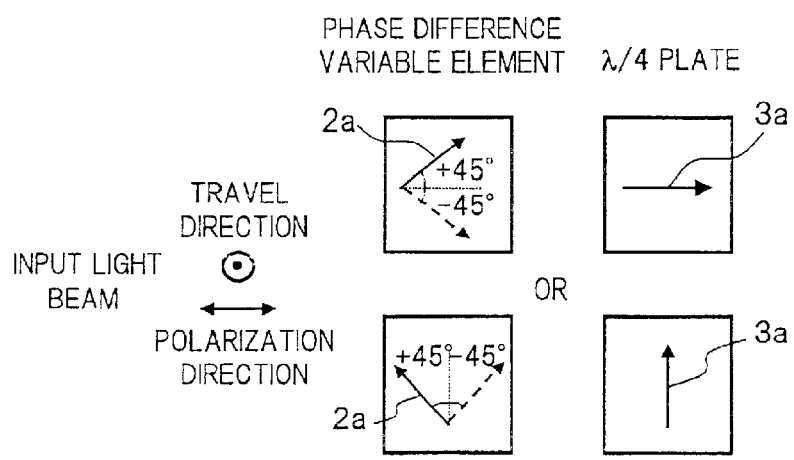
FIG. 2 shows a relationship between optical axes of a phase difference variable element and a $\lambda/4$ plate in the variable polarization plane rotator of FIG. 1.

The relationship between the optical axes of the phase difference variable element 2 and the λ/4 plate 3 is set as shown at the top of FIG. 2 such that an optical axis 3a (corresponding to C axis (slow axis) of a doubly refracting crystal) of the λ/4 plate 3 is in the same direction as the polarization direction of the input light beam, and an optical axis 2a of the phase difference variable element 2 is set at a +45 degree or −45 degree angle relative to the optical axis 3a of the λ/4 plate 3. Alternatively, as shown in the bottom of FIG. 2, the arrangement is such that the optical axis 3a of the λ/4 plate 3 is set at a 90 degree angle relative to the polarization direction of the input light beam, and the optical axis 2a of the phase difference variable element 2 is set at a +45 degree or −45 degree angle relative to the optical axis 3a of the λ/4 plate 3. In each relationship as shown in FIG. 2 as described above, the polarization direction of the linearly polarized light output from the lens 12 on the input side to be applied to the phase difference variable element 2 is turned to be at a ±45 degree angle relative to the optical axis 2a of the phase difference variable element 2.

The phase difference variable element 2 is capable of applying, to the light beam being transmitted, a variable phase difference α between a polarization component parallel to the optical axis 2a and a polarization component perpendicular to the optical axis 2a, and this variable phase difference α is adjusted to an arbitrary value by the phase difference adjustment section 4. As a specific example of the phase difference variable element 2, there is one formed by using liquid crystal devices of nematic liquid crystal and the like, or crystals having electro-optical effects such as lithium niobate ($LiNbO_3$) crystals, (Pb, La) (Zr, Ti) $O_3$ crystals (PLZT crystals) and the like. However, the phase difference variable element of the present invention is not limited to the abovementioned specific example.

The λ/4 plate 3 applies to the light beam being transmitted, a 90 degree phase difference between the polarization component parallel to the optical axis 3a and the polarization component perpendicular to the optical axis 3a. Here, considering a case where the wavelength dependence of the phase difference applied by the λ/4 plate 3 is small, the 90 degree phase difference is applied uniformly to the light beams of all wavelengths being transmitted through the λ/4 plate 3.

Figure 3:
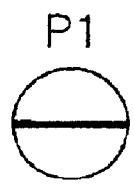
FIG. 3 shows the polarization state at each point of the variable polarization plane rotator of FIG. 1.
Figure 3:
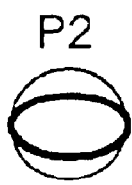
Figure 3:
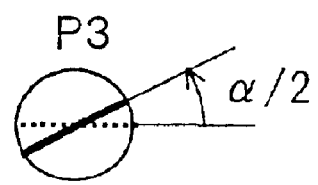
Figure 4A:
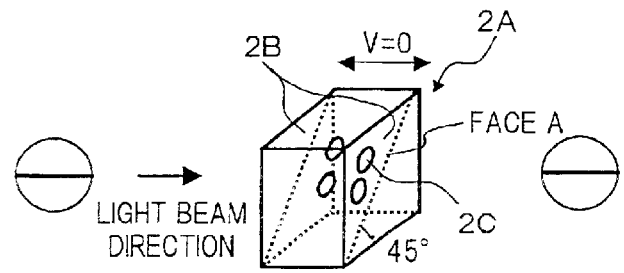
FIG. 4 is a schematic diagram for explaining the performance of the phase difference variable element used in the variable polarization plane rotator of FIG. 1, in which each of FIG. 4A through FIG. 4C shows a change in polarization state corresponding to a voltage applied to a liquid crystal cell.
FIG. 4D shows the rotation state of liquid crystal molecules.
Figure 4B:
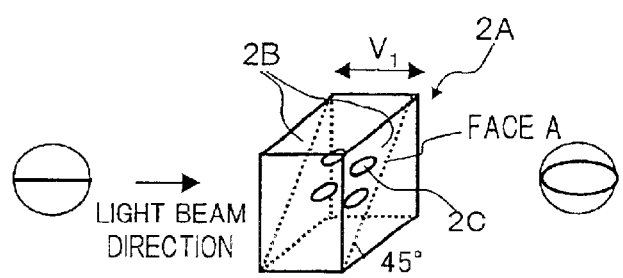
Figure 4C:
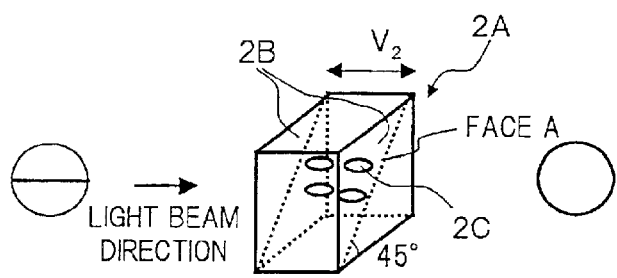
Figure 4D:
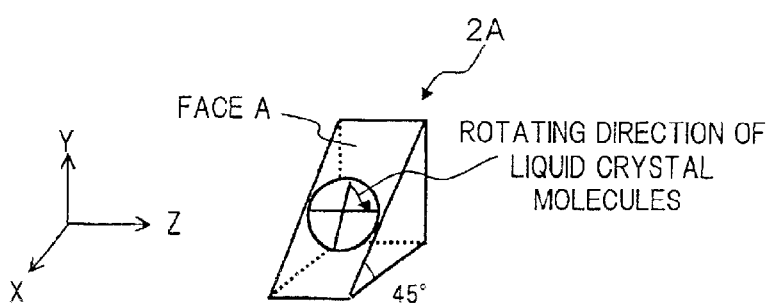

In the variable polarization plane rotator 1 with the above-described construction, the linearly polarized light is output from one end face of the ferrule 11 disposed on the input side optical fiber 10. The linearly polarized light is then collimated by the lens 12, to be input to the phase difference variable element 2 of the variable polarization plane rotator 1. Here, the consideration is made on the linearly polarized light in the horizontal plane as shown by P1 in FIG. 3 for the polarization state of input light beam (light beam at the point P1 of FIG. 1) to the phase difference variable element 2. Such input light beam is input to the phase difference variable element 2 in a state where the polarization direction is at a ±45 degree angle relative to the optical axis 2a of the phase difference variable element 2.

Here, the polarization direction of the input light beam in the present invention is not limited to the horizontal direction. The linearly polarized light in arbitrary direction is possible as the input light beam, and the optical axes of the phase difference variable element 2 and the λ/4 plate 3 are then set corresponding to the polarization direction of the input light beam.

In the phase difference variable element 2, the phase difference α is applied between the polarization component parallel to the optical axis 2a of the input light beam and the polarization component perpendicular to the optical axis 2a of the input light beam. As a result, the polarization state of the light beam transmitted through the phase difference variable element 2 (light beam at the point P2 of FIG. 1) is to be elliptical as shown by P2 in FIG. 3.

FIG. 4 is a schematic diagram showing the state of change in polarization state in the phase difference variable element 2. Here, the figure shows an example in which a nematic liquid crystal is used as the phase difference variable element 2. In the case where a nematic liquid crystal is used as the phase difference variable element 2, for example by adjusting a voltage V to be applied to transparent electrodes 2B of a liquid crystal cell 2A, liquid crystal molecules 2C are rotated on a face A (refer to FIG. 4D), and thus the phase difference α is applied between the polarization component parallel to the direction of the face A being an optical axis of the liquid crystal, and the polarization component perpendicular to the direction of the face A. To be specific, FIG. 4A shows a case where the linearly polarized light input when no voltage is applied to the liquid crystal cell 2A is output with no change of polarization, FIG. 4B shows a case where the linearly polarized light is changed to elliptically polarized light when voltage $V_1$ is applied to the liquid crystal cell 2A, and FIG. 4C shows a case where the linearly polarized light is changed to circularly polarized light when voltage $V_2$ ($\neq V_1$) is applied to the liquid crystal cell 2A.

Then, the light transmitted through the phase difference variable element 2 to be elliptically polarized is input to the λ/4 plate 3 having an optical axis 3a set at a ±45 degree angle from the optical axis 2a of the phase difference variable element 2, and Is changed to linearly polarized light which passes through the origin and the intersection of a tangential line of the ellipse parallel to the major axis of the ellipse and a tangential line of the ellipse parallel to the minor axis of the ellipse. As a result, the polarization state of the light beam transmitted through the λ/4 plate 3 (light beam at the point P3 of FIG. 1) becomes linearly polarized light in which the polarization plane of the input light beam is rotated by a required angle.

Here is a mathematical description of the rotation of the polarization plane of the linearly polarized light by the variable polarization plane rotator 1 as described above. Hereunder, as shown on the left of FIG. 4D, a coordinate system is set in which the x axis and y axis are set in a plane perpendicular to the direction of light beam travel, and the z axis is set in the direction of light beam travel.

Firstly, for the initial coordinates of the x-y plane, if the polarization direction of the input light beam is parallel to the x-axis, the linearly polarized light to be input to the phase difference variable element 2 is represented by the following equation (1).

$$\begin{pmatrix} x \\ y \end{pmatrix} = \begin{pmatrix} \sin(\omega t) \\ 0 \end{pmatrix} \quad (1)$$

where ω is angular frequency, and t is time.

Next, in order to apply a phase delay by the phase difference variable element 2 having the optical axis 2a at a 45 degree angle relative to the polarization direction of the input light beam, coordinate transformation is performed to a coordinate system (x', y') at a 45° angle according to the relationship shown in the following equation (2).

$$\begin{pmatrix} x' \\ y' \end{pmatrix} = \begin{pmatrix} \cos(45°) & \sin(45°) \\ -\sin(45°) & \cos(45°) \end{pmatrix} \begin{pmatrix} \sin(\omega t) \\ 0 \end{pmatrix} = \frac{1}{\sqrt{2}} \begin{pmatrix} \sin(\omega t) \\ -\sin(\omega t) \end{pmatrix} \quad (2)$$

If the phase delay in the x'-axis direction applied by the phase difference variable element 2 is a+α, and the phase delay in the y'-axis direction is a, the light beam after being transmitted through the phase difference variable element 2 is represented by the following equation (3).

$$\begin{pmatrix} x' \\ y' \end{pmatrix} = \frac{1}{\sqrt{2}} \begin{pmatrix} \sin(\omega t + a + \alpha) \\ -\sin(\omega t + a) \end{pmatrix} \quad (3)$$

Where the λ/4 plate 3 has the optical axis 3a at a −45° angle relative to the optical axis 2a of the phase difference variable element 2, that is, it has the optical axis 3a in the same direction as the polarization direction of the input light beam, retransformation is performed to the x-y coordinate system according to the relationship shown in the following equation (4).

$$\begin{pmatrix} x \\ y \end{pmatrix} = \begin{pmatrix} \cos(-45°) & \sin(-45°) \\ -\sin(-45°) & \cos(-45°) \end{pmatrix} \frac{1}{\sqrt{2}} \begin{pmatrix} \sin(\omega t + a + \alpha) \\ -\sin(\omega t + a) \end{pmatrix} \quad (4)$$

$$= \begin{pmatrix} \cos(\frac{\alpha}{2}) \cdot \sin(\omega t + a + \frac{\alpha}{2}) \\ \sin(\frac{\alpha}{2}) \cdot \cos(\omega t + a + \frac{\alpha}{2}) \end{pmatrix}$$

Where the phase delay in the x-axis direction applied by the λ/4 plate 3 is b+90°, and the phase delay in the y-axis direction is b, the light beam after being transmitted through the λ/4 plate 3 is represented by the following equation (5).

$$\begin{pmatrix} x \\ y \end{pmatrix} = \begin{pmatrix} \cos(\frac{\alpha}{2}) \cdot \sin(\omega t + a + \frac{\alpha}{2} + b + 90°) \\ \sin(\frac{\alpha}{2}) \cdot \cos(\omega t + a + \frac{\alpha}{2} + b) \end{pmatrix} \quad (5)$$

$$= \cos(\omega t + a + \frac{\alpha}{2} + b) \cdot \begin{pmatrix} \cos(\frac{\alpha}{2}) \\ \sin(\frac{\alpha}{2}) \end{pmatrix}$$

The light beam shown in the abovementioned equation (5) represents the linearly polarized light where the polarization plane of the input light beam is rotated by only α/2 degrees. Accordingly, in the construction of FIG. 1, in a case where the linearly polarized light output from the lens 12 on the input side is transmitted through the phase difference variable element 2, which applies the phase difference α, and the λ/4 plate 3 in succession, linearly polarized light whose polarization plane is rotated by α/2 degrees can be obtained. Therefore, in a case where it is desired to rotate the polarization plane of the input light beam, for example in a range of 0 through 90 degrees, the phase difference α applied by the phase difference variable element 2 may be made variable in a range of 0 through 180 degrees.

As described above, in the variable polarization plane rotator 1 of the first embodiment, by a simple combination of the phase difference variable element 2 using liquid crystal devices, crystals having electro-optical effects and the like, and the λ/4 plate 3, the polarization plane of the linearly polarized light can be rotated by an angle corresponding to the phase difference α applied by the phase difference variable element 2. Therefore, it is possible to achieve miniaturization and cost reduction compared with a conventional Faraday rotator or the like. Furthermore, by adjusting the phase difference α applied by a single phase difference variable element 2, the rotation angle of the polarization plane can be arbitrarily set, thus enabling easy control of the rotation angle.

Figure 5:
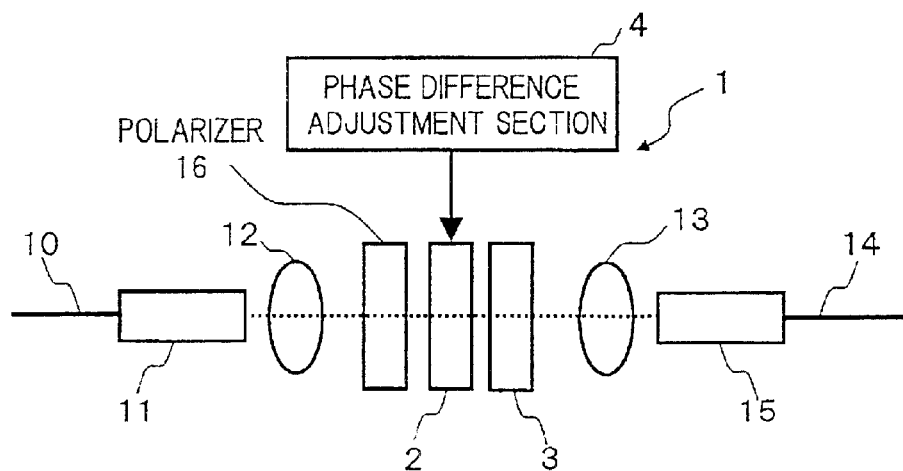
FIG. 5 is a block diagram showing an application example corresponding to an input light beam in an arbitrary polarization state, in relation to the variable polarization plane rotator of the first embodiment.

Here, in the first embodiment of the variable polarization plane rotator described above, the linearly polarized light in which the polarization state is maintained is output from the input side optical fiber 10. However, the present invention can also be applied to a case where a light beam of an arbitrary polarization state is output from the input side optical fiber 10. In this case, as shown in FIG. 5, for example, the arrangement may be such that a polarizer 16 which separates the linearly polarized light from the input light beam is inserted onto the optical path between the lens 12 on the input side and the phase difference variable element 2, and the optical axis of the λ/4 plate 3 is set to be in the same direction as an optical axis of this polarizer 16 or at a 90 degree angle.

Next is a description of a second embodiment of the variable polarization plane rotator according to the present invention.

Figure 6:
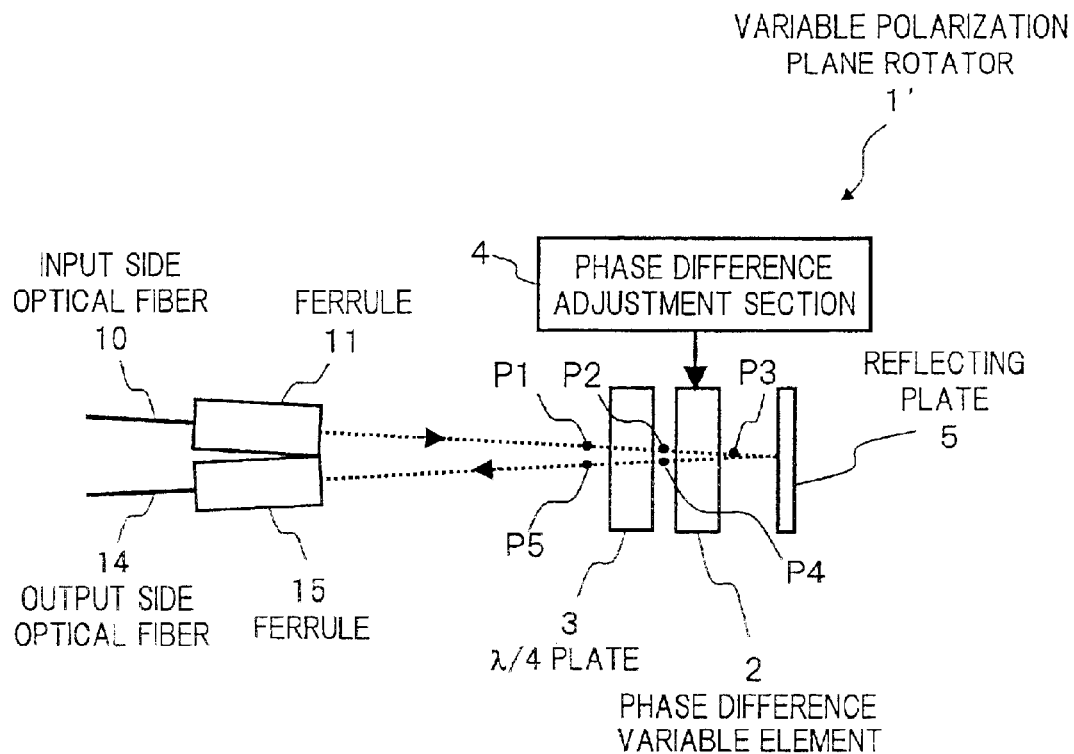
FIG. 6 is a block diagram showing a second embodiment of the variable polarization plane rotator according to the present invention.

FIG. 6 is a block diagram of a variable polarization plane rotator according to a second embodiment. Here, the same symbols are used for parts of the same construction as in the abovementioned first embodiment, and the same applies for other embodiments.

In FIG. 6, this variable polarization plane rotator 1' utilizes a reflecting type structure, wherein there is provided a reflecting plate 5 for reflecting light in addition to a phase difference variable element 2, a λ/4 plate 3 and a phase difference adjustment section 4 similar to the case of the first embodiment, and the λ/4 plate 3, the phase difference variable element 2 and the reflecting plate 5 are arranged in succession. In this reflecting type variable polarization plane rotator 1', the λ/4 plate 3 is positioned facing the end faces of an input side optical fiber 10 and an output side optical fiber 14, which are placed alongside each other on the same side, and thus an optical system is arranged such that the input light beam output from the input side optical fiber 10 is reflected by the variable polarization plane rotator 1', to be input to the output side optical fiber 14.

Here, in FIG. 6, a lens that collimates the light beam output from the end face of a ferrule 11 on the input side optical fiber 10 and a lens that collects the light reflected by the variable polarization plane rotator 1' on the end face of a ferrule 15 on the output side optical fiber 14 are omitted. Furthermore, here, the input side optical fiber 10 and the output side optical fiber 14 are arranged individually. However, it is possible to bind the input and output systems by using a two core optical fiber or the like. Moreover, in the structural example of FIG. 6, P1 and P2 denote an optical input point and an optical output point of the λ/4 plate 3 on the optical path on the going path side between the input side optical fiber 10 and the reflecting plate 5, P3 denotes a point between the phase difference variable element 2 and the reflecting plate 5, and also P4 and P5 denote an optical input point and an optical output point of the λ/4 plate 3 on the optical path on the return path side between the reflecting plate 5 and the output side optical fiber 14.

Figure 7:
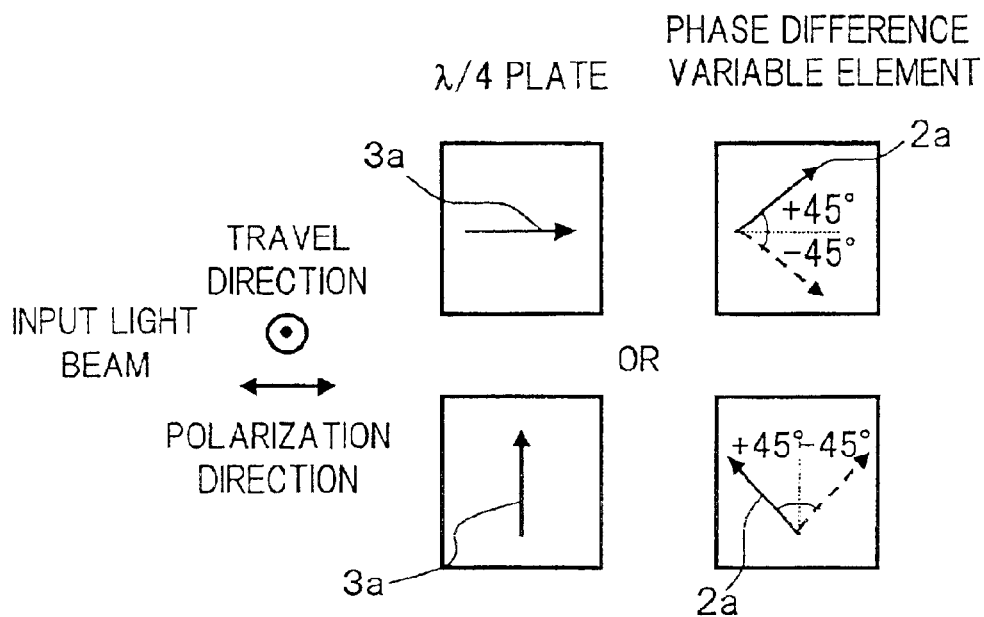
FIG. 7 is a diagram showing a relationship between optical axes of a $\lambda/4$ plate and a phase difference variable element in the variable polarization plane rotator of FIG. 6.

The relationship between the optical axes of the λ/4 plate 3 and the phase difference variable element 2 is basically the same as the case in the first embodiment. As shown at the top of FIG. 7, an optical axis 3a of the λ/4 plate 3 is set to be in the same direction as the polarization direction of the input light beam, and an optical axis 2a of the phase difference variable element 2 is set to a +45 degree angle or a −45 degree angle relative to the optical axis 3a of the λ/4 plate 3. Alternatively, as shown at the bottom of FIG. 7, the optical axis 3a of the λ/4 plate 3 can be set to a 90 degree angle relative to the polarization direction of the input light beam, and the optical axis 2a of the phase difference variable element 2 set to a +45 degree angle or a −45 degree angle relative to the optical axis 3a of the λ/4 plate 3.

In the reflecting type variable polarization plane rotator 1' as described above, the input light beam that is output from the input side optical fiber 10 and collimated is input to the λ/4 plate 3. Here, similarly to the case in the first embodiment, the consideration is made on the linearly polarized light in the horizontal direction as shown by P1 in FIG. 8 for the polarization state of light beam input to the λ/4 plate 3 (light beam at the point P1 of FIG. 6). In the λ/4 plate 3, since the optical axis 3a and the polarization direction of the input light beam are in the same direction, the input light beam is transmitted as is as the linearly polarized light without changing the polarization state, as shown by P2 in FIG. 8, and is transmitted to the phase difference variable element 2.

Figure 8:
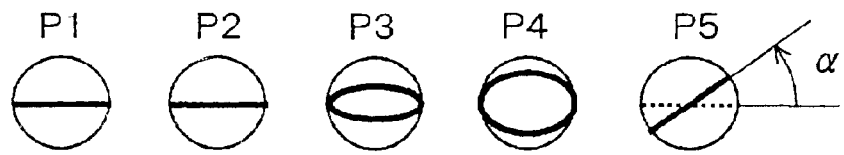
FIG. 8 is a diagram showing the polarization state at each point of the variable polarization plane rotator of FIG. 6.

In the phase difference variable element 2, similarly to the case in the first embodiment, a phase difference α is applied between the polarization component parallel to the optical axis 2a and the polarization component perpendicular to the optical axis 2a, for the linearly polarized light from the λ/4 plate 3, and a light beam whose polarization state is made to be elliptical according to the phase difference α as shown by P3 in FIG. 8 is generated. Then, the light beam transmitted through the phase difference variable element 2 and made to be elliptical is reflected by the reflector 5, to be returned to the phase difference variable element 2, and a phase difference α is applied on the return path similarly to the going path. The light beam that has made a round trip to and from the phase difference variable element 2 becomes an elliptically polarized light or a circularly polarized light as shown by P4 in FIG. 8, and is again input to the λ/4 plate 3.

In the λ/4 plate 3, since the optical axis 3a is at a ±45 degree angle relative to the optical axis 2a of the phase difference variable element 2, the light beam from the phase difference variable element 2 is changed to linearly polarized light which passes through the origin and the intersection of a tangential line of the ellipse parallel to the major axis of the ellipse and a tangential line of the ellipse parallel to the minor axis of the ellipse. As a result, the light beam transmitted through the λ/4 plate 3 to be sent to the output side optical fiber 15 becomes linearly polarized light in which the polarization plane of the input light beam is rotated by a required angle as shown by P5 in FIG. 8.

The relationships in the abovementioned equations (1) through (5) also show clearly that the rotation angle of the polarization plane by the reflecting variable polarization plane rotator 1' as described above becomes α degrees corresponding to a phase difference of 2α which is applied by the input light beam round trip to and from the phase difference variable element 2. Therefore, for example in a case where it is desired to rotate the polarization plane of the input light beam within the range of 0 through 90 degree angles, the phase difference α applied by the phase difference variable element 2 may be made to be variable within the range of 0 through 90 degrees.

In this manner, in the reflecting type variable polarization plane rotator 1' according to the second embodiment, it is possible to obtain a similar effect to the case in the first embodiment, and it is also possible to narrow the range of adjustment of the phase difference α applied by the phase difference variable element 2. Therefore, it is possible to reduce the voltage applied to the liquid crystal device or the like to be used as the phase difference variable element 2.

Figure 9:
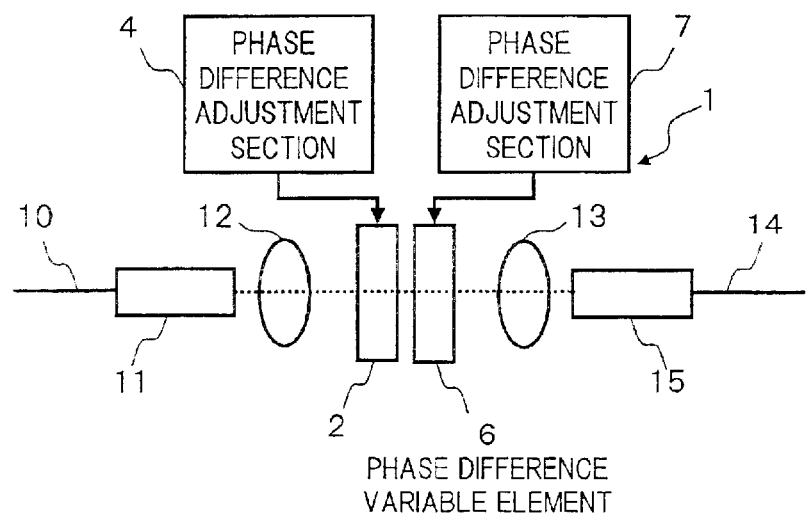
FIG. 9 is a block diagram of a case where a phase difference variable element and a phase difference adjustment section are disposed instead of the $\lambda/4$ plate, in relation to the variable polarization plane rotator according to the present invention.

Here, in the abovementioned variable polarization plane rotators 1 and 1' according to the first and second embodiments, in order to return the light beam whose polarization state has been made to be elliptical by the phase difference variable element 2, to linearly polarized light, the λ/4 plate 3 which applies a 90 degree phase difference uniformly to the polarization components perpendicular to each other is used. However, if the wavelength of the input light beam is deviated from the set wavelength, the phase difference applied by the typical λ/4 plate is deviated from 90 degrees. Therefore, if the wavelength range of the input light beam has a width at certain extent, there is a possibility that the λ/4 plate cannot apply a 90 degree phase difference to all the light beams in the wavelength range. In such a case, for example as shown in the block diagram of FIG. 9, it is preferable to dispose a phase difference variable element 6 that can change a phase difference, and a phase difference adjustment section 7 that adjusts the variable phase difference, instead of a λ/4 plate.

Figure 10:
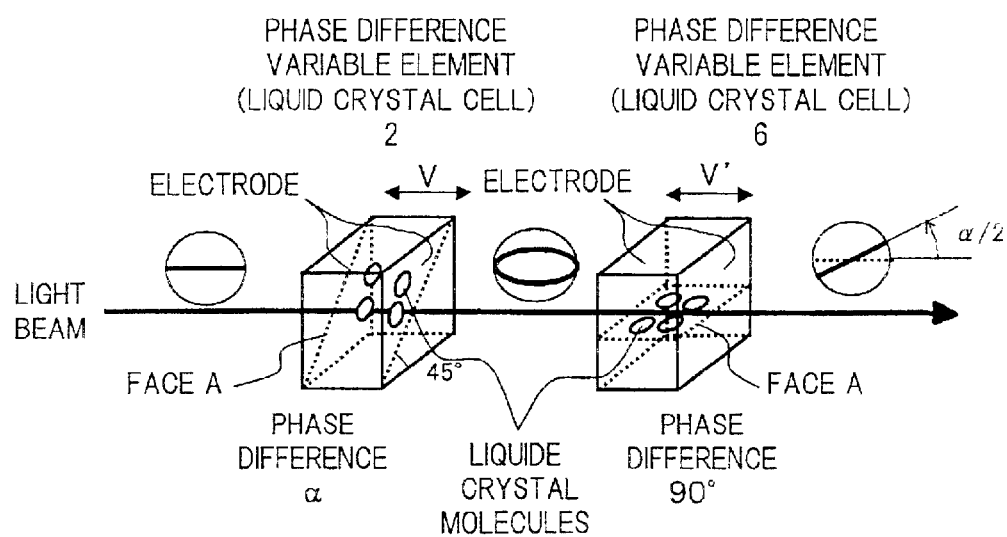
FIG. 10 is a diagram showing the construction of the main parts and a change in polarization state in a case where a nematic liquid crystal is used for the phase difference variable element in the variable polarization plane rotator of FIG. 9.
Figure 11:
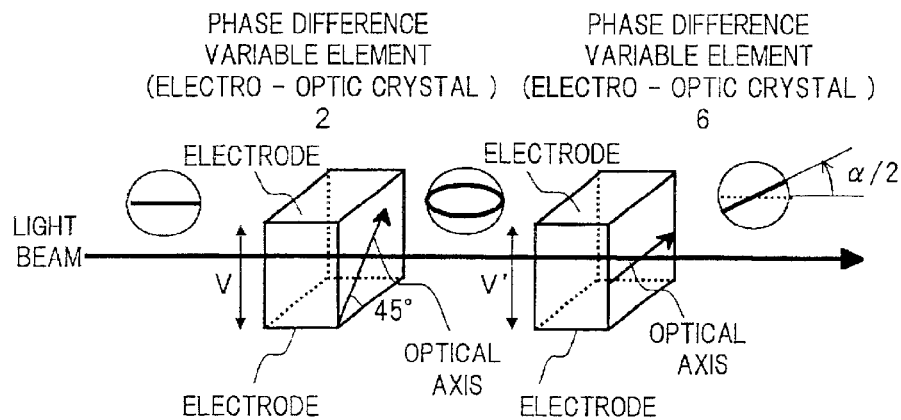
FIG. 11 is a diagram showing the construction of the main parts and the change in polarization state in a case where an electro-optical crystal is used for the phase difference variable element in the variable polarization plane rotator of FIG. 9.

An optical axis of the abovementioned phase difference variable element 6 is set to be in the same direction as, or at a 90 degree angle relative to, the polarization direction of the input light beam. A similar device to the phase difference variable element 2 can be used as this phase difference variable element 6. To be specific, it is possible to use a device formed by using liquid crystal devices of nematic liquid crystal and the like, or crystals having electro-optical effects such as lithium niobate ($LiNbO_3$) crystals, (Pb, La)(Zr, Ti) $O_3$ crystals (PLZT crystals) and the like. For example, in a case where nematic liquid crystal is used for each of the phase difference variable elements 2 and 6, the structure of the main parts and the change in the polarization state are as shown in FIG. 10. Furthermore, for example in a case where an electro-optical crystal is use for each of the phase difference variable elements 2 and 6, the structure of the main parts and the change in the polarization state are as shown in FIG. 11. In each structural example as described above, the arrangement is such that in the phase difference variable element 6, the phase difference of the set central wavelength in a state where a voltage is not applied to the element is set to be around 90 degrees, and a change in the phase difference due to a wavelength difference is compensated by adjusting the applied voltage. Since in many cases, adjustment of phase difference due to the wavelength difference is a minuscule value, the voltage applied to the phase difference variable element 6 becomes a comparatively small value.

Here, the selection of the liquid crystal device, the electro-optical crystal or the like to use for the phase difference variable element 2 for making linearly polarized light elliptical, and the phase difference variable element 6 for returning the elliptical light beam to linearly polarized light, is not limited to the examples shown in the abovementioned FIG. 10 and FIG. 11. Any desired combination of the materials is possible, and it is possible to select appropriately according to the operating conditions, cost and the like. Furthermore, in FIG. 9, in the above-mentioned transmission type structure shown in FIG. 1, the λ/4 plate has been replaced by a phase difference variable element. However, it is also possible to do the same for the structure of the reflecting type shown in FIG. 6.

Next is a description of embodiments of various optical devices using variable polarization plane rotators according to the present invention as described above.

Figure 12:
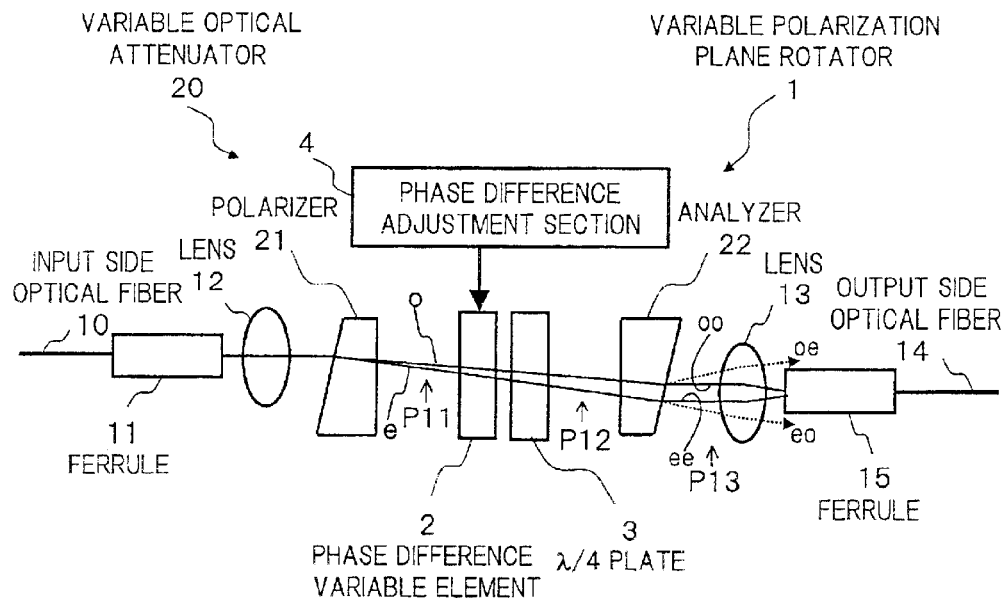
FIG. 12 is a block diagram showing an embodiment of a transmission type variable optical attenuator using the variable polarization plane rotator according to the present invention.

FIG. 12 is a block diagram showing an embodiment of a transmission type variable optical attenuator using a variable polarization plane rotator according to the present invention.

In FIG. 12, the construction of a variable optical attenuator 20 is such that, for example, a polarizer 21 and an analyzer 22 formed by using wedge doubly refracting crystals are arranged in front of and behind the abovementioned variable polarization plane rotator 1 shown in FIG. 1, a light beam output from an input side optical fiber 10 is input to the polarizer 21 via a lens 12, and a light beam in a predetermined polarization state transmitted through the analyzer 22 is input to an output side optical fiber 14 via a lens 13. Furthermore, the polarizer 21 and the analyzer 22 are arranged such that the directions of their optical axes are coincident with each other, and the optical axis of the λ/4 plate 3 is set to be in the same direction as, or at a 90 degree angle relative to, these optical axes.

Here, P11 denotes a point between the polarizer 21 and the variable polarization plane rotator 1, P12 denotes a point between the variable polarization plane rotator 1 and the analyzer 22, and P13 denotes a point between the analyzer 22 and the lens 13.

Figure 13:
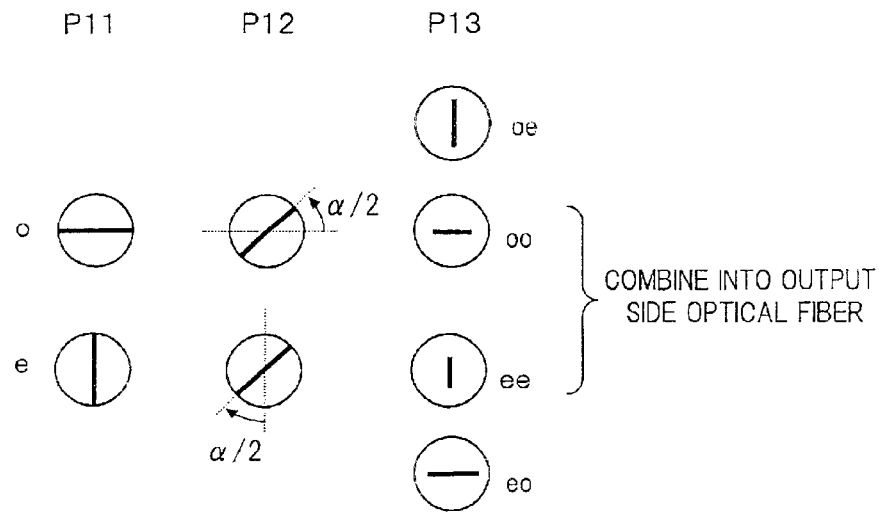
FIG. 13 is a diagram showing the polarization state at each point of the variable optical attenuator of FIG. 12.

In the variable optical attenuator 20 with a construction as described above, a light beam output from one end face of a ferrule 11 disposed on the input side optical fiber 10 is collimated in the lens 12, to be input to the polarizer 21, and separated into an ordinary light o and an extraordinary light e, to be transmitted to the variable polarization plane rotator 1, respectively. The polarization direction of the ordinary light o and the extraordinary light e input to the variable polarization plane rotator 1 are, for example as shown by P11 in FIG. 13, in a horizontal direction and a vertical direction, to be perpendicular to each another.

The ordinary light o and the extraordinary light e input to the variable polarization plane rotator 1 are transmitted through the phase difference variable element 2 and the λ/4 plate 3 in succession, whereby the planes of polarization are rotated according to the rotation angle corresponding to the phase difference α applied by the phase difference variable element 2, to be transmitted to the analyzer 22. To be specific, as shown by P12 in FIG. 13, the lights o and e transmitted through the variable polarization plane rotator 1 become linearly polarized lights in which their planes of polarization are rotated by the same angle α/2 but in opposite directions.

The lights o and e, in which their planes of polarization are rotated by the variable polarization plane rotator 1, input to the analyzer 22, are separated into an ordinary light and extraordinary light by the analyzer 22. Here, the separated components of the light o input to the analyzer 22 are designated as an ordinary light oo and an extraordinary light oe, and the separated components of the light e input to the analyzer 22 are designated as an ordinary light eo and an extraordinary light ee. The polarization directions of each of the lights oo, oe, eo and ee are as shown by P13 in FIG. 13. For these lights transmitted through the analyzer 22, since the directions of optical axes of the polarizer 21 and the analyzer 22 are coincident with each other, the directions of travel of the ordinary light oo and the extraordinary light ee become parallel, and the ordinary light oo and the extraordinary light ee are focused onto the end face of the ferrule 15 by the lens 13, to be input to the output side optical fiber 14 (optical paths shown by solid lines in FIG. 12). On the other hand, since the directions of travel of the extraordinary light oe and the ordinary light eo transmitted through the analyzer 22 are not parallel and are far apart, even though the extraordinary light oe and the ordinary light eo pass through the lens 13, they are not coupled into one end of the output side optical fiber 14 (optical paths shown by broken lines in FIG. 12).

To be specific, in a case where an input light to this variable optical attenuator 20 does not have its polarization plane rotated by the variable polarization plane rotator 1, since the ordinary light o separated by the polarizer 21 is output from the analyzer 22 as the ordinary light oo, and the extraordinary light e separated by the polarizer 21 is output from the analyzer 22 as the extraordinary light ee, the ordinary light o and the extraordinary light e in the polarizer 21 are coupled into the output side optical fiber 14 via the lens 13. On the other hand, in a case where the input light beam has its polarization plane rotated by 90 degrees by the variable polarization plane rotator 1, since the ordinary light o separated by the polarizer 21 is output from the analyzer 22 as the extraordinary light oe, and the extraordinary light e separated by the polarizer 21 is output from the analyzer 22 as the ordinary light eo, even though the ordinary light o and the extraordinary light e in the polarizer 21 pass through the lens 13, they are not coupled into the output side optical fiber 14.

In this manner, an amount of light input to the output side optical fiber 14 is changed according to an amount of rotation of the polarization plane in the variable polarization plane rotator 1, and hence the structure of the optical system shown in FIG. 12 functions as a variable optical attenuator.

Here, since a ratio of the amounts of the ordinary light oo and the extraordinary light oe (oo/oe ratio) and a ratio of the amounts of the extraordinary light ee and the ordinary light eo (ee/eo ratio), output from the analyzer 22, are determined by the absolute values of the rotation angles of the polarization planes of the ordinary light o and the extraordinary light e in the variable polarization plane rotator 1, the ratios become equal (oo/oe ratio=ee/eo ratio). As a result, the amount of the light input to the output side optical fiber 14 does not depend on the polarization state of the light beam output from the input side optical fiber 10, so that the variable optical attenuator 20 can obtain stable optical attenuation characteristics in which a variation in incident polarization dependence does not occur.

As described above, according to the variable optical attenuator 20 of this embodiment, it is possible to achieve miniaturization and low cost compared with a variable optical attenuator using a conventional Faraday rotator or the like, and also it is possible to control a variable attenuation amount easily.

Next is a description of another embodiment of a variable optical attenuator using the variable polarization plane rotator according to the present invention.

Figure 14:
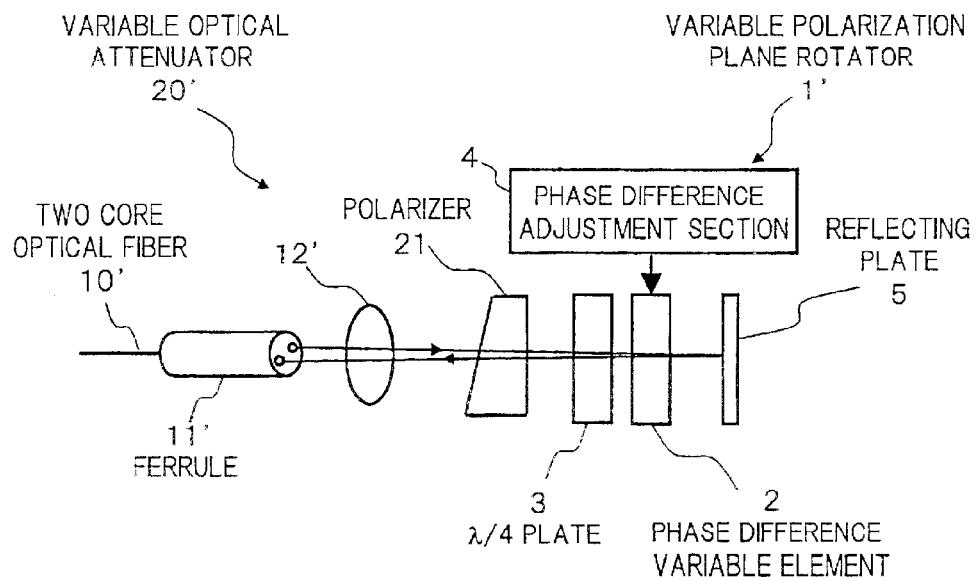
FIG. 14 is a block diagram showing an embodiment of a reflecting type variable optical attenuator using the variable polarization plane rotator according to the present invention.

FIG. 14 is a block diagram showing an embodiment of a reflecting type variable optical attenuator using the variable polarization plane rotator according to the present invention.

In FIG. 14, for the variable optical attenuator 20' a polarizer 21 formed for example by using a wedge doubly refracting crystal is arranged facing the λ/4 plate 3 side of the abovementioned reflecting type variable polarization plane rotator 1' shown in FIG. 6. Here, a light beam output from the input side optical path of a double core optical fiber 10' is input to the polarizer 21 via a lens 12', the light beam transmitted through the polarizer 21 is propagated inside the variable polarization plane rotator 1', and reflected by the reflecting plate 5, to be returned to the polarizer 21, and the light beam in a predetermined polarization state transmitted through the polarizer 21 again is input to the output side optical path of the optical fiber 10' via the lens 12'. Furthermore, the optical axes of the polarizer 21 and the λ/4 plate 3 are arranged to be in the same direction or at a 90 degree angle.

Figure 15A:
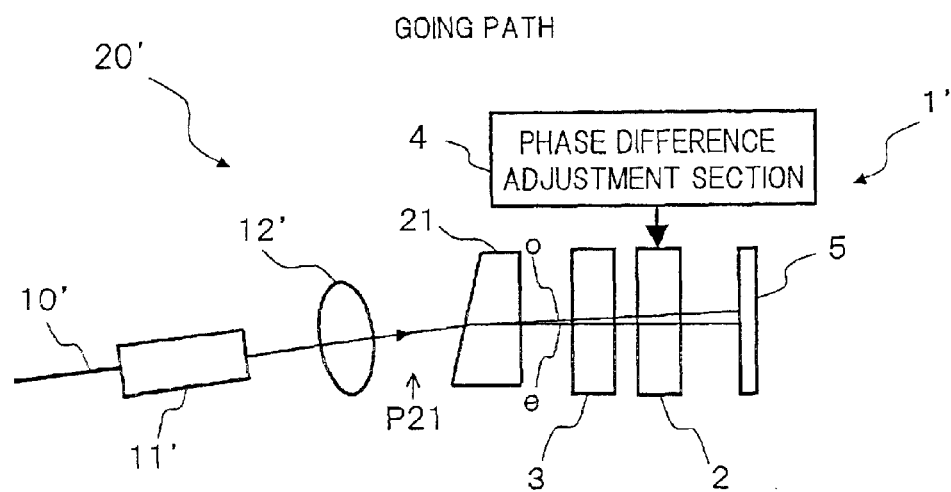
FIG. 15A shows an optical path on going path.
Figure 16:
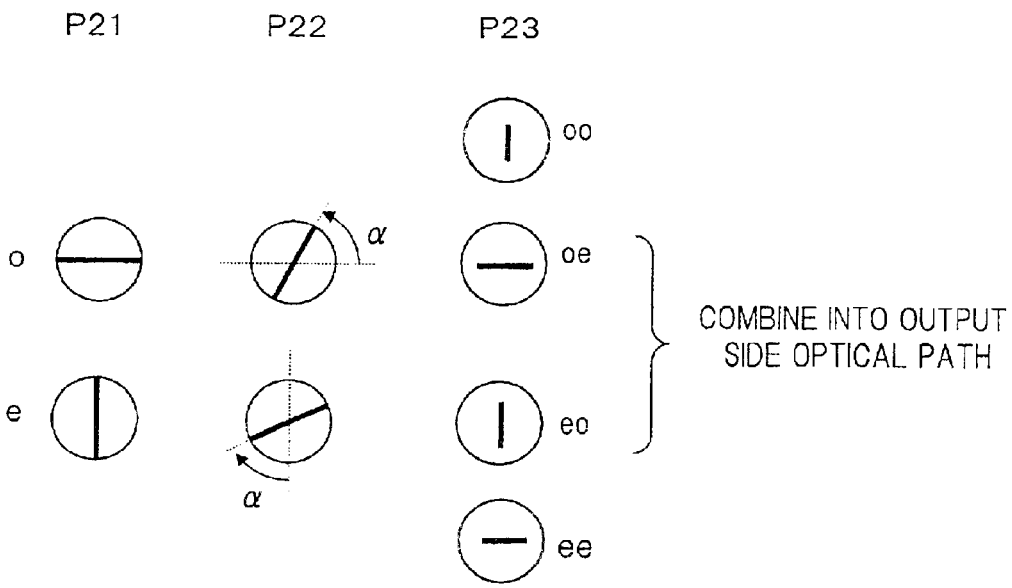
FIG. 16 is a diagram showing the polarization state at each point of the variable optical attenuator of FIG. 12.

In the reflecting type variable optical attenuator 20' with the construction as described above, as shown by the going path of FIG. 15A, the light beam propagated through the input side optical path of the optical fiber 10', and output from one end face of a ferrule 11', is collimated by the lens 12', to be input to the polarizer 21, and separated into an ordinary light o and an extraordinary light e, to be sent to the reflecting type variable polarization plane rotator 1', respectively. The polarization directions of the ordinary light o and the extraordinary light e (light beams passing through the position shown by P21 in FIG. 15A) input to the variable polarization plane rotator 1' are, for example as shown by P21 in FIG. 16, in a horizontal direction and a vertical direction respectively, to be perpendicular to each other.

The ordinary light o and the extraordinary light e input to the variable polarization plane rotator 1' are sent to the λ/4 plate 3, and the optical axis of the λ/4 plate 3 is in the same direction as, or at a 90 degree angle relative to, the polarization direction of each light. Thus, the ordinary light o and the extraordinary light e are transmitted as the linearly polarized light without changing their polarization, to the phase difference variable element 2.

Figure 15B:
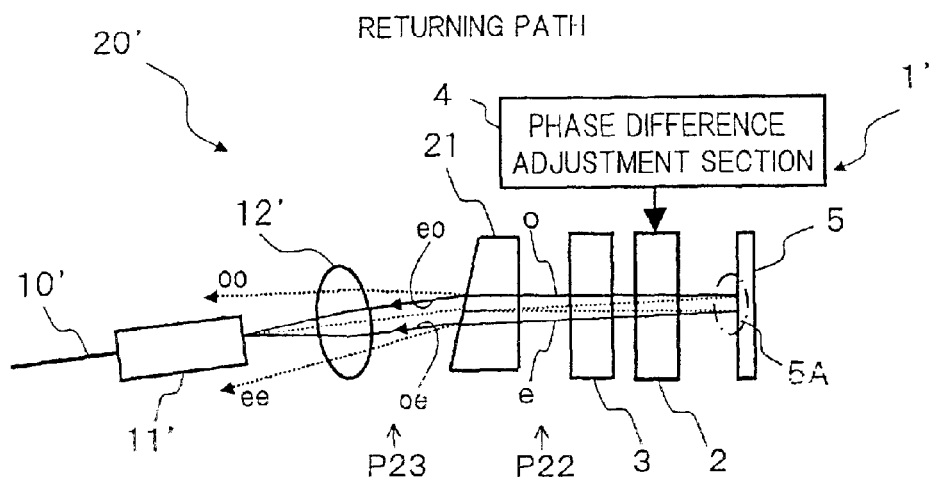
FIG. 15B shows the optical path on returning path.
Figure 17:
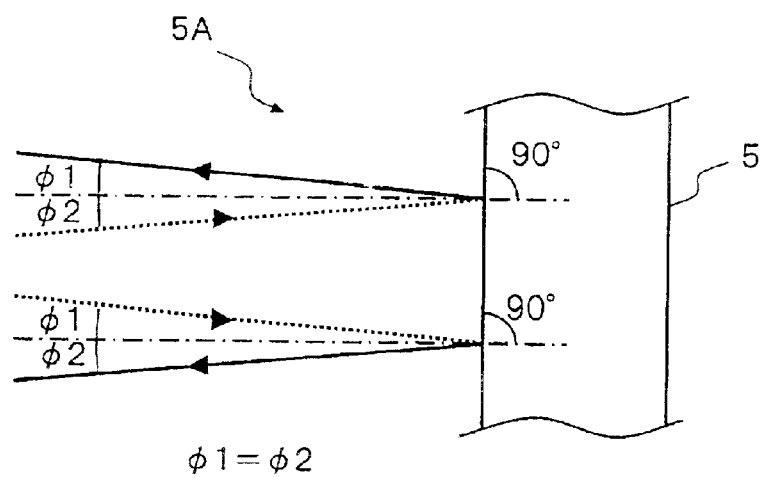
FIG. 17 is an enlarged diagram of the optical path in the vicinity of a reflecting surface in the variable optical attenuator of FIG. 12.

In the phase difference variable element 2, both of the lights o and e transmitted through the λ/4 plate 3 have a phase difference α applied between the polarization component parallel to, and the polarization component perpendicular to, the optical axis of the phase difference variable element 2, and are thus made to be elliptical. The lights o and e transmitted through the phase difference variable element 2 and made to be elliptical, are as shown by the return path in FIG. 15B, reflected by the reflector 5, to be returned to the phase difference variable element 2, and a phase difference α is applied on the return path similarly to the going path. As a result, the lights o and e that have made a round trip to and from the phase difference variable element 2 become elliptically polarized light or circularly polarized light, and are again input to the λ/4 plate 3. Here, for the input-output state of the lights o and e on a reflecting surface 5A of the reflector 5, as shown in the enlarged diagram of FIG. 17, an optical system is designed such that the relationship ø1=ø2 is satisfied between an incident angle ø1 and an emission angle ø2.

In the λ/4 plate 3, the lights o and e that have made a round trip to and from the phase difference variable element 2 are changed to linearly polarized lights that pass through the origin and the intersection of a tangential line of the ellipse parallel to the major axis of the ellipse and a tangential line of the ellipse parallel to the minor axis of the ellipse. As a result, the lights o and e (lights passing through the position shown by P22 in FIG. 15B) transmitted through the λ/4 plate 3 and sent to the polarizer 21 become linearly polarized lights in which their polarization planes at the time of input are rotated by α degrees in directions opposite to each other as shown by P22 in FIG. 16.

The lights o and e, in which their polarization planes are each rotated by a degrees and returned to the polarizer 21, are separated into an ordinary light and an extraordinary light by the polarizer 21. Here, the re-separated components of the light o input to the polarizer 21 are designated as an ordinary light oo and an extraordinary light oe, and the re-separated components of the light e input to the polarizer 21 are designated as an ordinary light eo and an extraordinary light ee. The polarization directions of the lights oo, oe, eo and ee are as shown by P23 in FIG. 16. The extraordinary light oe and the ordinary light eo of the light beams transmitted through the polarizer 21, whose directions of travel become parallel, are focused onto the end face of the ferrule 11' by the lens 12', to be input to the output side optical path of an optical fiber 11' (optical paths shown by solid lines in FIG. 15B). On the other hand, for the ordinary light oo and the extraordinary light ee, since their directions of travel are not parallel and are far apart, even though they pass through the lens 12', they are not coupled into the output side optical path of the optical fiber 11' (optical paths shown by broken lines in FIG. 15B).

To be specific, in a case where the input light to this variable optical attenuator 20' does not have its polarization plane rotated by the variable polarization plane rotator 1', the ordinary light o separated on the going path is output on the return path as the ordinary light oo, and the extraordinary light e separated on the going path is output on the return path as the extraordinary light ee. Therefore, even though the ordinary light o and the extraordinary light e on the going path are focused by the lens 12', they are not coupled into the output side optical path of the optical fiber 11'. On the other hand, in a case where the input light has its polarization plane rotated by 90 degrees by the variable polarization plane rotator 1', the ordinary light o separated on the return path by the polarizer 21 is output on the return path as the extraordinary light oe, and the extraordinary light e separated on the going path is output on the return path as the ordinary light eo, so that the ordinary light o and the extraordinary light e on the going path are coupled into the output side optical path of the optical fiber 11' via the lens 12'.

In this manner, the amount of light input to the output side optical path of the optical fiber 11' is changed according to the amount of rotation of the polarization plane in the variable polarization plane rotator 1', and hence the structure of the reflecting type optical system shown in FIG. 14 also functions as a variable optical attenuator.

As described above, in the reflecting type variable optical attenuator 20' of the present embodiment, it is possible to obtain a similar effect to the above-mentioned transmission type variable optical attenuator 20. Furthermore, it is possible to narrow the range of adjustment of the phase difference α required to be applied by the phase difference variable element 2 in order to obtain the same range of optical attenuation as the transmission type. Therefore it is possible to reduce the voltage applied to the liquid crystal device or the like to be used as the phase difference variable element 2.

Next is a description of an embodiment of an optical switch using the variable polarization plane rotator according to the present invention.

Figure 18:
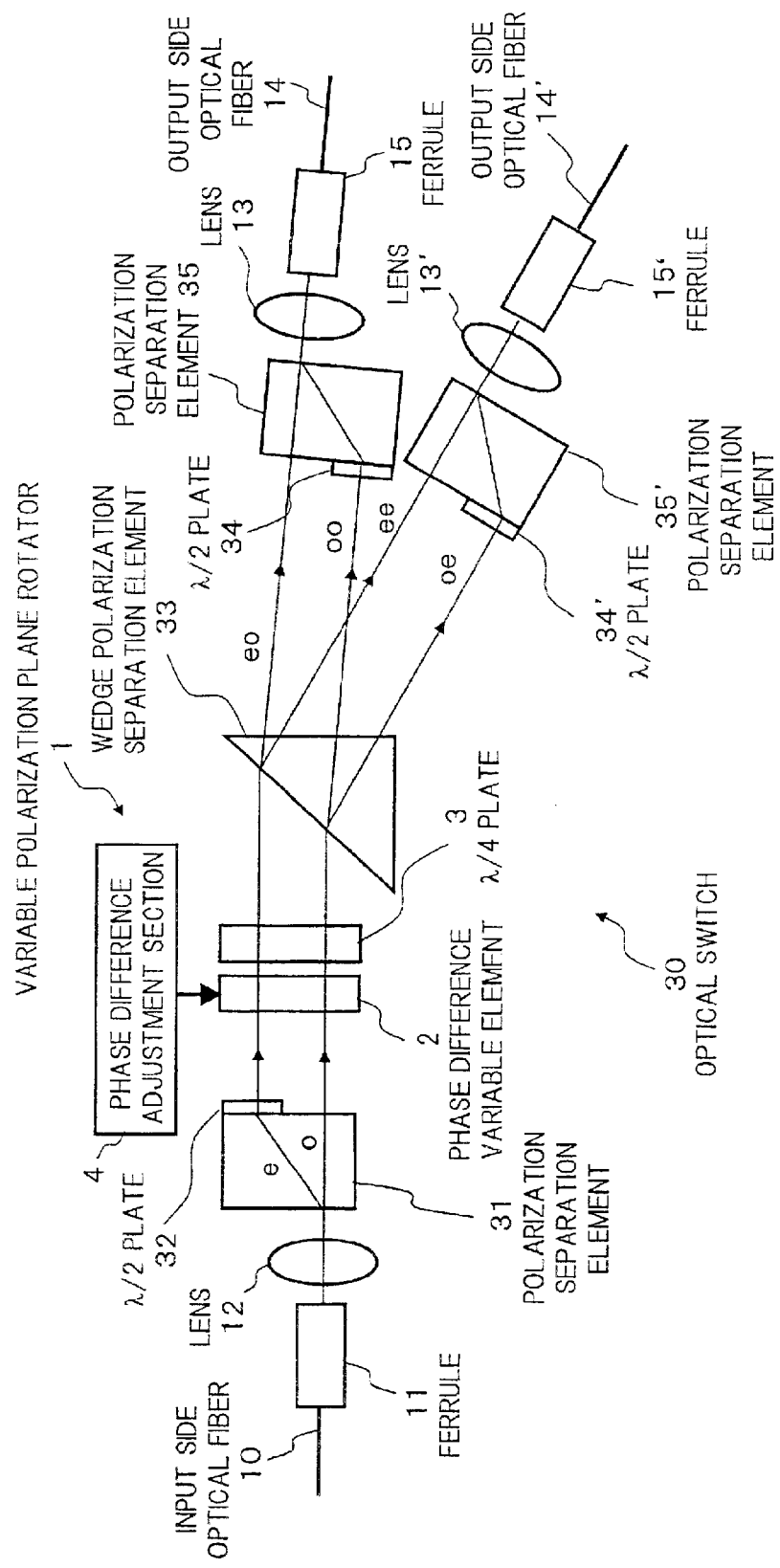
FIG. 18 is a block diagram showing an embodiment of a 1×2 optical switch using the variable polarization plane rotator according to the present invention.

FIG. 18 is a block diagram showing an embodiment of a 1×2 optical switch using the variable polarization plane rotator according to the present invention.

In FIG. 18, a 1×2 optical switch 30 has, for example, a polarization separation element 31 serving as a first polarization separation section and a ½ wavelength plate (referred to hereunder as a λ/2 plate) 32 serving as a polarization plane coincidence control section arranged on the input side optical path of the abovementioned transmission type variable polarization plane rotator 1, and also a wedge polarization separation element 33 serving as a second polarization separation section arranged on the output side optical path of the variable polarization plane rotator 1. The construction is such that a light beam output from an input side optical fiber 10 is input to the polarization separation element 31 via a lens 12, and light beams that are separated by the wedge polarization separation element 33 to be branched into two different directions are input to output side optical fibers 14 and 14' via λ/2 plates 34 and 34' serving as polarization restoring sections, polarization separation elements 35 and 35' serving as polarization combining sections, and lenses 13 and 13', respectively.

The polarization separation element 31 is one which separates the input light beam collimated by the lens 12, into an ordinary light o and an extraordinary light e with spacing greater than the diameter of its beam. To be specific, it is possible to use, for example, a parallel rutile plate or the like.

The λ/2 plate 32 is, for example, arranged on the optical path of the extraordinary light e output from the polarization separation element 31 (here, attached to one half of the emission side face of the polarization separation element 31), has an optical axis at a 45 degree angle relative to the polarization direction of the abovementioned extraordinary light e, and rotates by 90 degrees the polarization direction of the extraordinary light e being transmitted. As a result, the ordinary light o and the extraordinary light e separated by the polarization separation element 31 are input to the variable polarization plane rotator 1 as two lights o and e whose polarization directions are coincident with each other.

The wedge polarization separation element 33 has an optical axis in the same direction as, or at a 90 degree angle relative to, the optical axis of the polarization separation element 31. The wedge polarization separation element 33 is input with the lights o and e, which are transmitted through the variable polarization plane rotator 1 and have their polarization planes rotated by 0 degrees or 90 degrees, and causes the refraction on the lights o and e depending on their polarizations, to output to either one of two optical paths whose directions of travel are different. For a specific example of this wedge polarization separation element 33, it is possible to use a wedge rutile plate or the like.

The λ/2 plates 34 and 34' each rotate by 90 degrees the polarization plane of one of the lights transmitted in the same direction, whose optical paths are switched after transmitted through the wedge polarization separation element 33, and thus restore the polarization states of both lights to the same state as at the time of input.

The polarization separation elements 35 and 35' combine the lights transmitted directly from the wedge polarization separation element 33 and the lights transmitted via the λ/2 plates 34 and 34', to output the combined lights to the lenses 13 and 13' respectively. To be specific, it is possible to use, for example, a parallel rutile plate. Here, it is possible to arrange the polarization separation elements 35 and 35', and the λ/2 plates 34 and 34', similar to the polarization separation element 31 and the λ/2 plate 32 disposed on the input side, symmetrically, according to the direction of each output optical path.

In the optical switch 30 with a construction as described above, a light beam output from the end face of the ferrule 11 of the input side optical fiber 10 is collimated by the lens 12, to be input to the polarization separation element 31, and after being separated into the ordinary light o and the extraordinary light e, the extraordinary light e is further transmitted through the λ/2 plate 32 and the polarization direction thereof is rotated by 90 degrees to be aligned with the polarization direction of the ordinary light o. As a result, the two lights o and e whose directions of travel are parallel with each other and polarization directions are coincident with each other are input to the variable polarization plane rotator 1.

The lights o and e input to the variable polarization plane rotator 1 are sent to the wedge polarization separation element 33 with their polarization planes rotated by 90 degrees or not rotated after being transmitted through the phase difference variable element 2 and the λ/4 plate 3 in succession. In the wedge polarization separation element 33, since the refractive index between an optical axis direction and a direction perpendicular to it is different, the lights o and e are refracted according to the rotation of the polarization plane in the variable polarization plane rotator 1. To be specific, in a case where the polarization rotation by the variable polarization plane rotator 1 is 0 degrees, the lights o and e become ordinary lights (here, designated as lights oo and eo) in the wedge polarization separation element 33, and their directions are changed by being refracted as ordinary lights. On the other hand, in a case where the polarization rotation by the variable polarization plane rotator 1 is 90 degrees, the lights o and e become extraordinary lights (here, designated as lights oe and ee) in the wedge polarization separation element 33, and their directions are changed by being refracted as extraordinary lights. In this manner, since the refractive indexes of the ordinary lights oo and eo, and the extraordinary lights oe and ee in the wedge polarization separation element 33 are different, it is possible to select the optical path of the transmission light according to the amount of polarization rotation by the variable polarization plane rotator 1.

The lights oo and eo transmitted through the wedge polarization separation element 33 and input to one optical path, are sent to the polarization separation element 35 on which the λ/2 plate 34 is disposed, and are combined after their polarization states are restored to the same state as at the time of input. Then, the combined light is focused onto the end face of the ferrule 15 via the lens 13, to be input to the output side optical fiber 14. Furthermore, the lights oe and ee transmitted through the wedge polarization separation element 33 and output to the other optical path, are, similarly to the above, input to the output side optical fiber 14' from the end face of the ferrule 15' via the λ/2 plate 34', the polarization separation element 35' and the lens 13'.

In this manner, according to the present embodiment, it is possible to construct a 1×2 optical switch for switching an optical path by using the transmission type variable polarization plane rotator 1.

Next is a description of an application example in which miniaturization is achieved for an optical switch using the variable polarization plane rotator as mentioned above.

Figure 19:
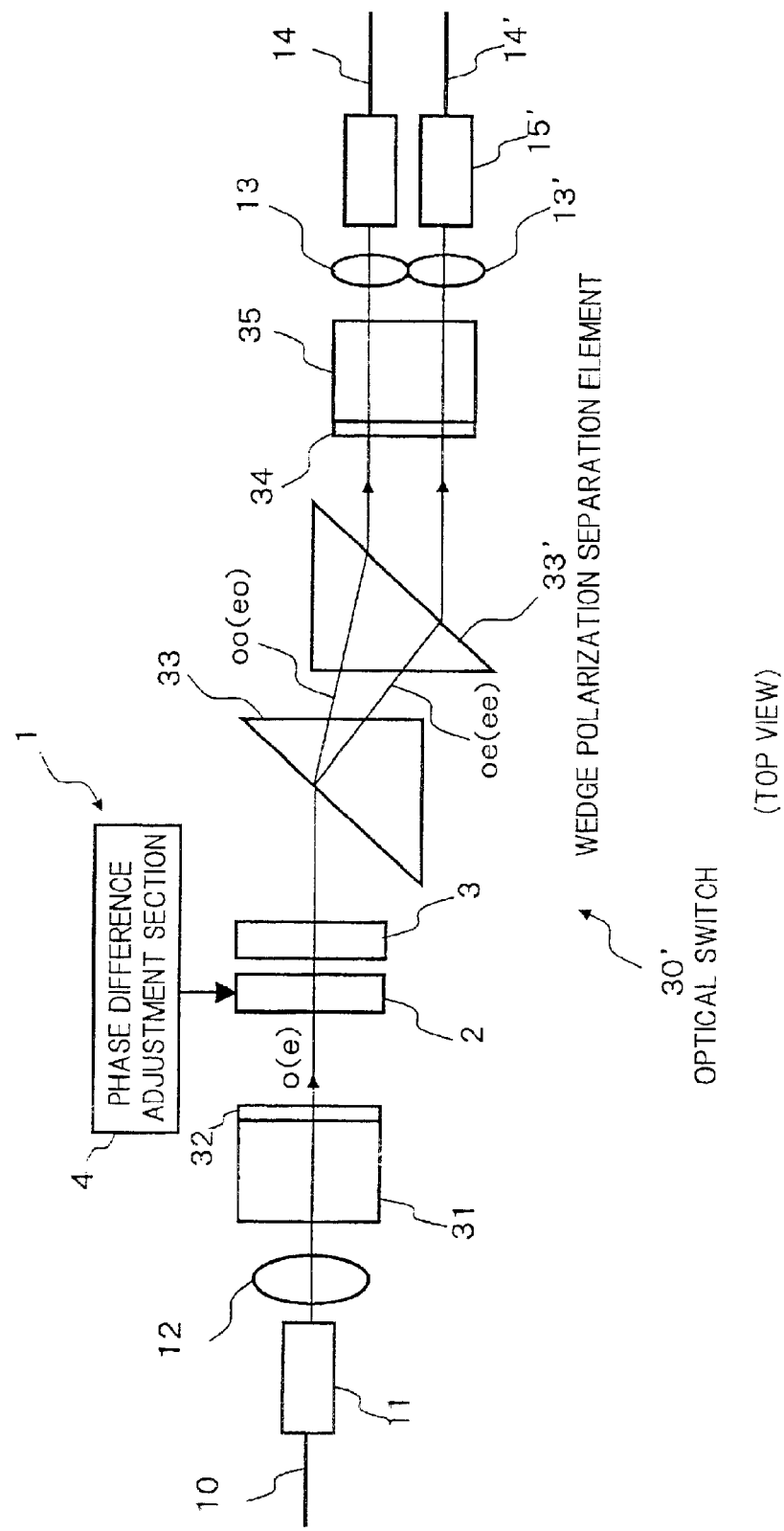
FIG. 19 is a top view showing the structure of an application example of a 1×2 optical switch using the variable polarization plane rotator according to the present invention.
Figure 20:
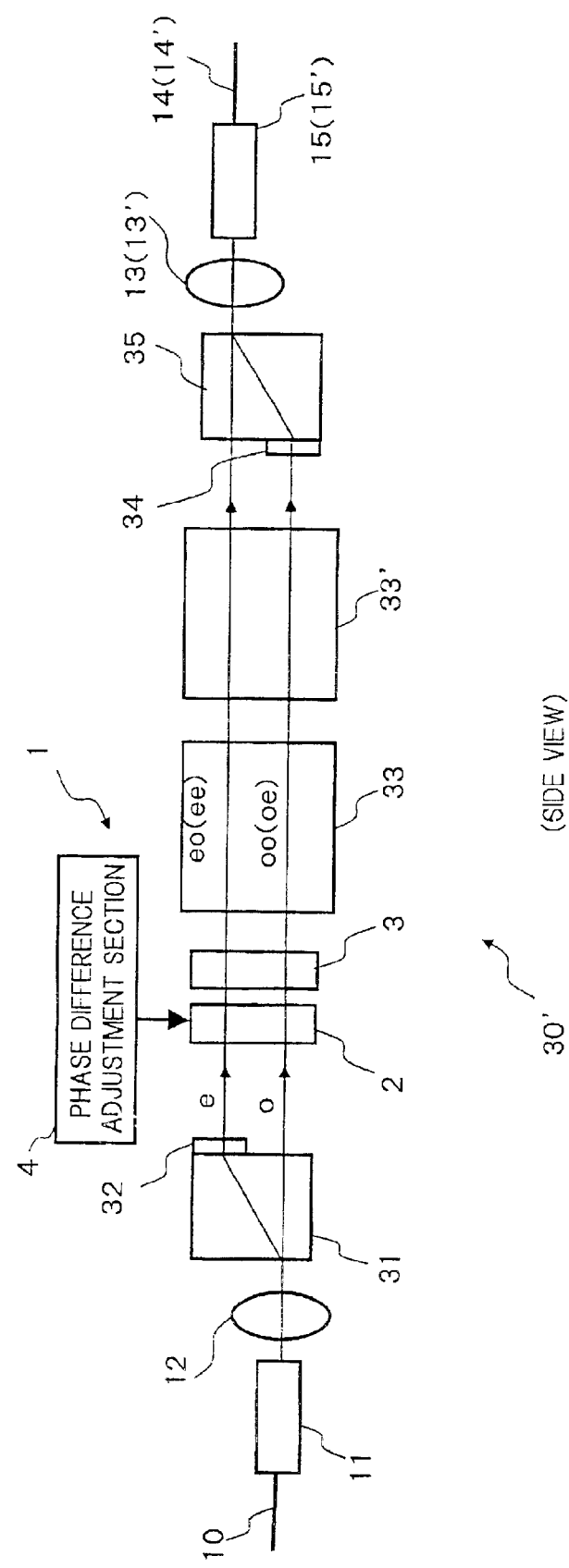
FIG. 20 is a side view showing the structure of the application example of the 1×2 optical switch using the variable polarization plane rotator according to the present invention.

FIG. 19 and FIG. 20 are block diagrams showing an application example of an optical switch using the abovementioned variable polarization plane rotator. FIG. 19 is a top view and FIG. 20 is a side view.

In both figures, the differences in the structure of an optical switch 30', from the structure of the optical switch 30 shown in the aforementioned FIG. 18, are that a wedge polarization separation element 33' is inserted onto the optical paths of the lights output from the wedge polarization separation element 33, and the lights propagated through the optical paths are guided to the output side optical fibers 14 and 14' via a single polarization separation element 35 on which a λ/2 plate 34 is disposed. The structure of parts other than these is the same as for the optical switch 30.

The wedge polarization separation element 33' is a polarization separation element with the same shape and the same quality as the wedge polarization separation element 33. To be specific, it is possible to use, for example, a wedge rutile plate or the like. This wedge polarization separation element 33' is arranged between the wedge polarization separation element 33 and the polarization separation element 35 in such an optical position relationship that the directions of travel of the lights output in different directions by the wedge polarization separation element 33 are approximately parallel with each other.

In this manner, by constructing the optical system of an optical switch by using the pair of wedge polarization separation elements 33 and 33', it is possible to make common the λ/2 plates and the polarization separation elements which have been individually disposed corresponding to the optical paths for performing switching, thus enabling miniaturization of the optical switch as a whole.

Next is a description of an embodiment of an optical filter using the variable polarization plane rotator according to the present invention.

Figure 21:
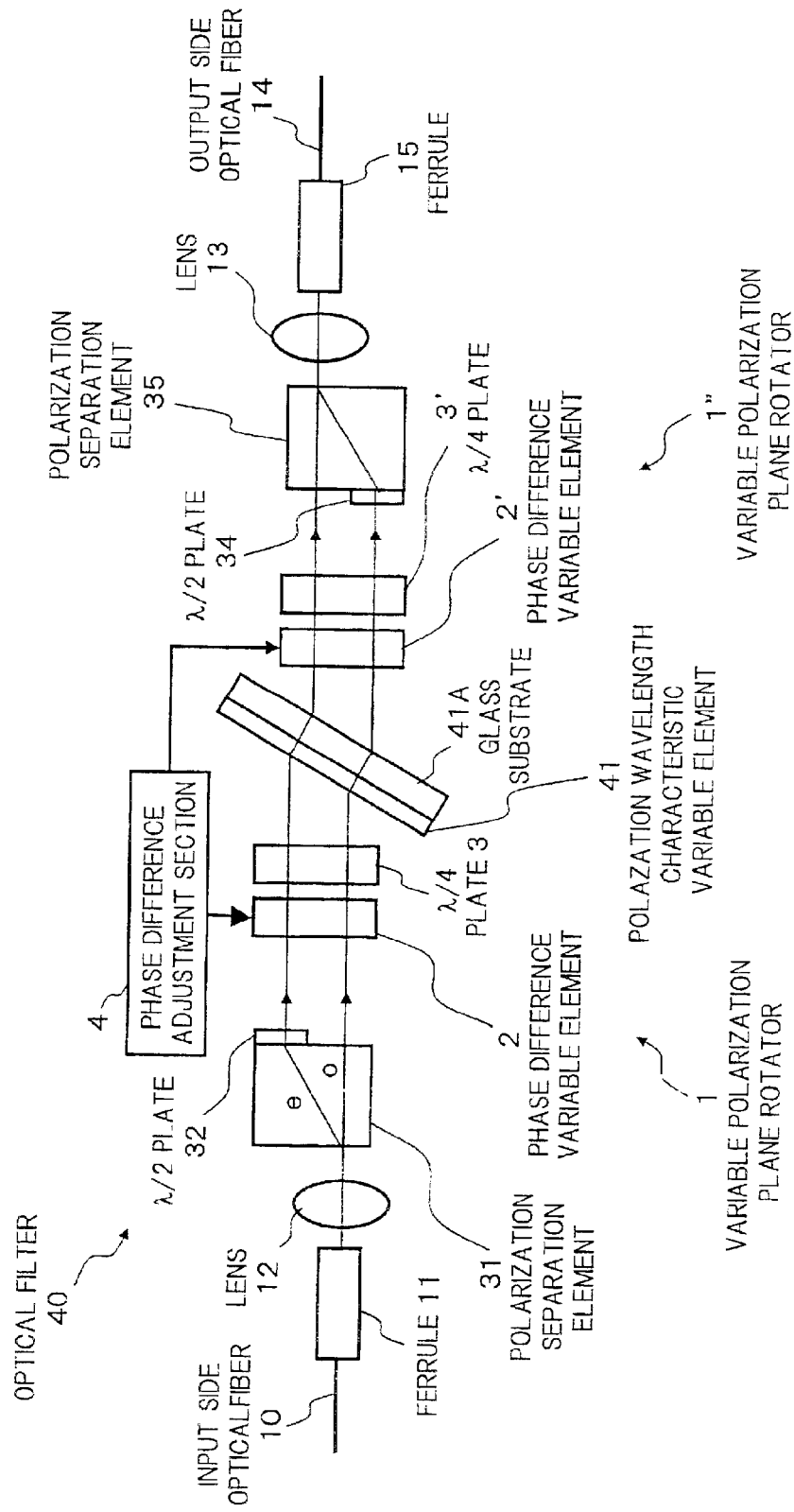
FIG. 21 is a plan view showing the structure of an optical filter using the variable polarization plane rotator according to the present invention.
Figure 22:
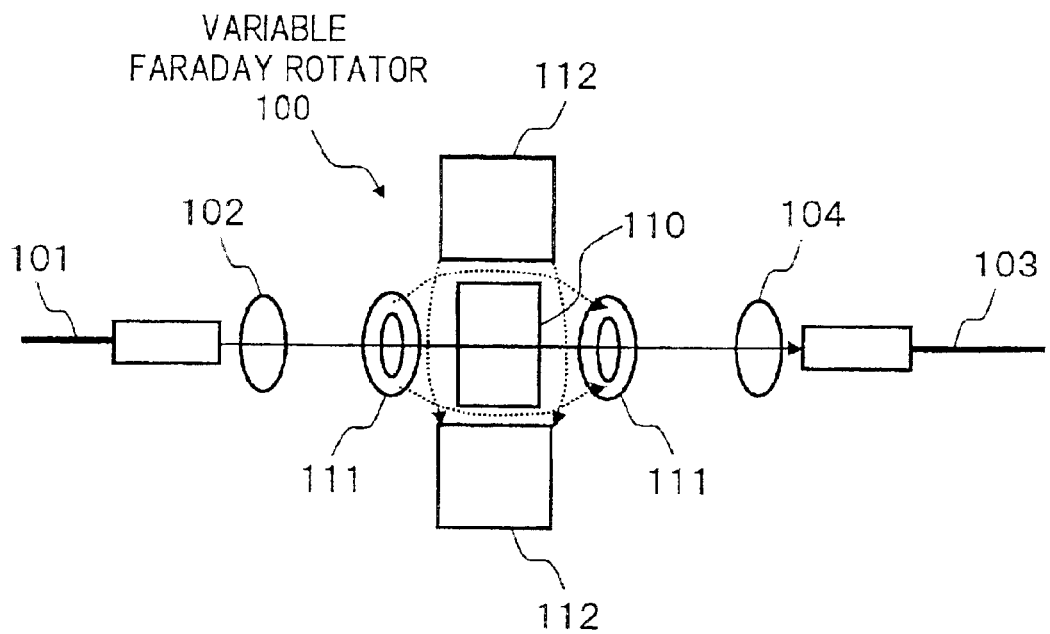
FIG. 22 shows a structural example of a conventional variable Faraday rotator.

FIG. 21 is a plan view showing the structure of an optical filter using the variable polarization plane rotator according to the present invention.

In FIG. 21, an optical filter 40 is an optical filter that, if the level of light output from an input side optical fiber 10 is changed with respect to the wavelength, by changing the dependence of the transmission ratio on wavelength (transmission wavelength characteristics) actively, a transmission light having a required wavelength characteristics can be obtained. A basic structure of such an optical filter is described in, for example, the abovementioned Japanese Unexamined Patent Publication No. 11-271700. The present optical filter 40 is characterized in that miniaturization and low cost are achieved by using the variable polarization plane rotator according to the present invention, instead of a variable Faraday rotator as used in the conventional construction.

To be specific, the abovementioned optical filter 40 has, for example, transmission type variable polarization plane rotators 1 and 1" as described above arranged respectively in front of and behind a polarization wavelength characteristic changing element 41. The construction is such that, similarly to the aforementioned optical switch shown in FIG. 18, a light beam is input to a polarization separation element 31, to be separated into an ordinary light o and an extraordinary light e, and the ordinary light o and the extraordinary light e whose polarization directions are aligned with each other by a λ/2 plate 32 are input to the variable polarization plane rotator 1 on the input side. Furthermore, the lights transmitted through the polarization wavelength characteristic changing element 41 and the variable polarization plane rotator 1" are input to a λ/2 plate 34 and a polarization separation element 35 to be combined, and then input to an output side optical fiber 14 via a lens 13.

The polarization wavelength characteristic changing element 41 is an optical element having wavelength characteristics in that there is a difference between a change in the transmission ratio (or reflection ratio) of P polarized light being a horizontally polarized light, and a change in the transmission ratio (or reflection ratio) of S polarized light being a vertically polarized light. In FIG. 21, the polarization wavelength characteristic changing element 41 is evaporation coated onto a glass substance 41A. As a specific example of this polarization wavelength characteristic changing element 41, it is possible to use dielectric multilayer films or the like, formed by alternately laminating high refractive index thin films and low refractive index thin films of dielectrics.

The variable polarization plane rotator 1 arranged on the input side of the abovementioned polarization wavelength characteristic changing element 41 is for controlling the wavelength characteristics of this filter 40 variably by controlling the rotation of the polarization plane of light beams input to the polarization wavelength characteristic changing element 41, and changing the ratio (transmission ratio) of the P polarized light and that of the S polarized light.

The variable polarization plane rotator 1" located on the output side of the polarization wavelength characteristic changing element 41 is for restoring the polarization states of both lights to the states before being transmitted through the variable polarization plane rotator 1 of the input side, by controlling the reverse rotation of the polarization planes of the lights transmitted through the polarization wavelength characteristic changing element 41.

Here, the rotation angles of the polarization planes in the variable polarization plane rotators 1 and 1" are adjusted according to signals output from a common phase difference adjustment section 4. However, it is also possible to dispose a phase difference adjustment section for each of the variable polarization plane rotators 1 and 1'.

In the optical filter with a construction as described above, the light beam output from the end face of a ferrule 11 of the input side optical fiber 10 is collimated by the lens 12, to be input to the polarization separation element 31, and after being separated into the ordinary light o and the extraordinary light e, the extraordinary light e is further transmitted through the λ/2 plate 32 and its polarization direction is rotated by 90 degrees to be aligned with the polarization direction of the ordinary light o. As a result, the two lights o and e whose directions of travel are parallel with each other and polarization directions coincident with each other are input to the variable polarization plane rotator 1.

In the variable polarization plane rotator 1, the polarization plane of the input light beam is rotated, and the ratio of the P polarized light to the S polarized light to be input to the polarization wavelength characteristic changing element 41 is controlled so that desired transmission wavelength characteristics can be obtained at the polarization wavelength characteristic changing element 41. As a result, the transmission wavelength characteristics of the polarization wavelength characteristic changing element 41 are changed according to the amount of rotation of the polarization plane by the variable polarization plane rotator 1.

The lights o and e transmitted through the polarization wavelength characteristic changing element 41, depending on the desired transmission wavelength characteristics, are rotated in reverse by the variable polarization plane rotator 1" such that the polarization planes rotated by the variable polarization plane rotator 1 on the input side are restored to the previous polarization planes. Then, the lights o and e transmitted through the variable polarization plane rotator 1" on the output side are sent to the polarization separation element 35 on which the λ/2 plate 34 is disposed, and after their polarization states are restored to the states at the time of input, they are combined and focused onto the end face of the ferrule 15 via the lens 13, to be input to the output side optical fiber 14.

In this manner, according to the present embodiment, it is possible to construct an optical filter that can change transmission wavelength characteristics actively by using the transmission type variable polarization plane rotator 1 of the present invention. In such an optical filter, the transmission wavelength characteristics are controlled according to the angle of the polarization plane of linearly polarized light input to the polarization wavelength characteristic changing element 41. Therefore, the variable polarization plane rotator according to the present invention, which can control the rotation of the polarization plane of a linearly polarized light by an arbitrary angle is suitable, and compared with a case where a conventional variable Faraday rotator is used, it becomes possible to achieve miniaturization and low cost of an optical filter.

Here, in the abovementioned optical filter 40, the construction is such that the polarized lights whose polarization planes are rotated and controlled by the variable polarization plane rotator 1 on the input side, are transmitted through the polarization wavelength characteristic changing element 41, to be sent to the variable polarization plane rotator 1" on the output side. However, the present invention is not limited to this. It is possible to use a reflecting type construction in which polarized lights reflected by the polarization wavelength characteristic changing element 41 are sent to the variable polarization plane rotator 1" on the output side. In this case, the wavelength dependence of the reflection ratio in the polarization wavelength characteristic changing element 41 is changed according to the rotation angle of the polarization plane by the variable polarization plane rotator 1 on the input side, and the filter characteristics are controlled actively.

Here, in the abovementioned descriptions of each embodiment, a variable polarization plane rotator of the present invention is applied to a variable optical attenuator, an optical switch, and an optical filter. However, the range of applications of a variable polarization plane rotator according to the present invention is not limited to this. It may be applied to various well-known optical devices that require rotation control of the polarization plane of linearly polarized light.

What is claimed is:

1. A variable polarization plane rotator for rotating a polarization plane of linearly polarized light, comprising:

a phase plate that has an optical axis in the same direction as, or at a 90 degree angle relative to, a polarization direction of an input light beam, and applies, to the light beam being transmitted, a 90 degree phase difference between a polarization component parallel to said optical axis and a polarization component perpendicular to said optical axis, a phase difference variable element that has an optical axis at a 45 degree angle relative to the optical axis of said phase plate, and applies, to the light beam being transmitted, a variable phase difference between the polarization component parallel to said optical axis and the polarization component perpendicular to said optical axis, a phase difference adjustment section that adjusts the variable phase difference of said phase difference variable element, and wherein after being transmitted through said phase difference variable element said input light beam is made into an elliptically polarized light or a circularly polarized light, the elliptically polarized light or the circularly polarized light being thereafter transmitted through said phase plate, to thereby be made into a linearly polarized light, so that the polarization plane of said input light beam is rotated by an angle corresponding to the phase difference applied by said phase difference variable element.

2. A variable polarization plane rotator according to claim 1, wherein said variable polarization plane rotator has a transmission type construction in which said input light beam output from an input side optical path is transmitted through said phase difference variable element and said phase plate in succession, to be input to an output side optical path.

3. A variable polarization plane rotator according to claim 1, further comprising a reflecting plate for reflecting light, wherein said variable polarization plane rotator has a reflection type construction in which said input light beam output from an input side optical path is transmitted through said phase plate and said phase difference variable element in succession, to be reflected by said reflecting plate, and again transmitted through said phase difference variable element and said phase plate in succession, to be input to an output side optical path.

4. A variable polarization plane rotator according to claim 1, wherein said phase difference variable element is formed using a liquid crystal device.

5. A variable polarization plane rotator according to claim 1, wherein said phase difference variable element is formed using a material having an electro-optical effect.

6. A variable polarization plane rotator according to claim 1, wherein said phase plate is a ¼ wavelength plate formed from a doubly refracting crystal.

7. A variable optical attenuator using a variable polarization plane rotator of claim 1, comprising:

a first polarization separation element that carries out polarization separation of light output from an input side optical path to apply the separated lights to said variable polarization plane rotator, a second polarization separation element that carries out polarization separation of light output from said variable polarization plane rotator to input lights of predetermined polarization state into an output side optical path; and wherein an amount of light input to said output side optical path is made variable by adjusting a rotation angle of the polarization plane, at said variable polarization plane rotator, of the linearly polarized light which has been separated by said first polarization separation element.

8. A variable optical attenuator using a variable polarization phase rotator according to claim 2, further comprising:
- a first polarization separation element that carries out polarization separation of light output from an input side optical path to apply the separated lights to said variable polarization plane rotator; and
- a second polarization separation element that carries out polarization separation of light output from said variable polarization plane rotator to input lights of predetermined polarization state into an output side optical path,
- wherein a light output end face of said input side optical path is opposite to a light input end face of said output side optical path;
- wherein said first polarization separation element, said variable polarization plane rotator, and said second polarization separation element are arranged in succession between said light output end face and said light input end face; and
- wherein an amount of light input to said output side optical path is made variable by adjusting a rotation angle of the polarization plane, at said variable polarization plane rotator, of the linearly polarized light which has been separated by said first polarization separation element.

9. A variable optical attenuator using a variable polarization plane rotator according to claim 3, further comprising:
- a first polarization separation element that carries out polarization separation of light output from an input side optical path to apply the separated lights to said variable polarization plane rotator; and
- a second polarization separation element that carries out polarization separation of light output from said variable polarization plane rotator to input lights of predetermined polarization state into an output side optical path,
- wherein a light output end face of said input side optical path and a light input end face of said output side optical path are arranged on the same side,
- wherein said first polarization separation element, and said reflection type variable polarization plane rotator, are arranged in succession facing said light output end face and said light input end face;
- wherein light transmitted through said first polarization separation element is reflected inside said variable polarization plane rotator to be returned to said first polarization separation element, so that said first polarization separation element also functions as said second polarization separation element; and
- wherein an amount of light input to said output side optical path is made variable by adjusting a rotation angle of the polarization plane, at said variable polarization plan rotator, of the linearly polarization light which has been separated by said first polarization separation element.

10. An optical switch using a variable polarization plane rotator of claim 1, comprising:
- a first polarization separation section that carries out polarization separation of light output from the input side optical path;
- a polarization plane coincidence control section that makes a plurality of linearly polarized lights separated by said first polarization separation section coincide with respective polarization faces, to apply these linearly polarized lights to said variable polarization plane rotator,
- a second polarization separation section that carries out polarization separation of light output from said variable polarization plane rotator to output the separated lights to any of a plurality of optical paths for which the travel directions are mutually different;
- a plurality of polarization restoring sections that restore the polarization of light output by said second polarization separation section to each optical path to the polarization state before polarization separation by said first polarization separation section; and
- a plurality of polarization combining sections that combines lights for which the polarization states have been restored by said polarization restoring section, to input the combined light to the output side optical paths corresponding to said each optical path,
- wherein switching of said plurality of output side optical paths is performed by adjusting the rotation angle of the polarization plane, at said variable polarization plane rotator, of the linearly polarized light which has been separated by said first polarization separation section.

11. An optical switch according to claim 10,
- wherein said second polarization separation section is a wedge polarization separation element.

12. An optical switch according to claim 11,
- wherein said optical switch is provided with a third polarization separation section comprising a wedge polarization separation element with the same shape and the same quality as said second polarization separation section, and
- the directions of travel of lights output to respective optical paths from said second polarization separation section are made approximately parallel with each other by being transmitted through said third polarization separation section, and said approximately parallel respective lights are input to output side optical paths corresponding to said respective optical paths via said single polarization restoring section and said single polarization combining section.

13. An optical filter using a variable polarization plane rotator of claim 1, comprising:
- a polarization separation element that carries out polarization separation of light output from an input side optical path to apply the separated lights to said variable polarization plane rotator; and
- a polarization wavelength characteristics changing element that is input with a linearly polarized light output from said variable polarization plane rotator, and has a characteristic in that wavelength changes for transmission ratio or reflection ratio for two polarization components which intersect within a horizontal plane perpendicular to the travel direction of said linearly polarized light are different,
- wherein the wavelength characteristics for transmission light or reflection light of said polarization wavelength characteristic changing element are made variable by adjusting a rotation angle of the polarization plane, at said variable polarization plane rotator, of the linearly polarized light which has been separated by said polarization separation element, to change a ratio of said two intersecting polarization components for the linearly polarized light input to said polarization wavelength characteristic changing element.

* * * * *